United States Patent
Li et al.

(10) Patent No.: US 11,480,671 B1
(45) Date of Patent: Oct. 25, 2022

(54) MODE A/C/S TRANSPONDER POSITIONING SYSTEM AND METHOD FOR USING THE SAME

(71) Applicant: SEAMATICA AEROSPACE LTD., St. John's (CA)

(72) Inventors: Yake Li, St. John's (CA); Siu Donald O'Young, St. John's (CA)

(73) Assignee: SEAMATICA AEROSPACE LTD., St. John's (CA)

( * ) Notice: Subject to any disclaimer, the term of this patent is extended or adjusted under 35 U.S.C. 154(b) by 361 days.

(21) Appl. No.: 16/669,081

(22) Filed: Oct. 30, 2019

Related U.S. Application Data

(60) Provisional application No. 62/752,605, filed on Oct. 30, 2018.

(51) Int. Cl.
*G01S 13/87* (2006.01)
*G01S 13/00* (2006.01)
*G01S 13/74* (2006.01)
*G01S 3/48* (2006.01)
*G01S 5/04* (2006.01)
*G01S 13/76* (2006.01)
*G01S 13/933* (2020.01)

(52) U.S. Cl.
CPC .............. *G01S 13/878* (2013.01); *G01S 3/48* (2013.01); *G01S 5/04* (2013.01); *G01S 13/003* (2013.01); *G01S 13/74* (2013.01); *G01S 13/765* (2013.01); *G01S 13/933* (2020.01)

(58) Field of Classification Search
CPC .. G08G 5/0078; G08G 5/0082; G08G 5/0013; G08G 5/0026; G01S 13/933; G01S 13/781; G01S 13/765; G01S 13/767; G01S 13/87; G01S 2013/466; G01S 13/872; G01S 13/726; G01S 13/74; G01S 13/825; G01S 2205/003; G01S 5/04; G01S 13/782; G01S 13/913; G01S 13/878; G01S 5/02; G01S 5/12; G01S 5/14; G01S 13/876; G01S 3/46

See application file for complete search history.

(56) References Cited

U.S. PATENT DOCUMENTS

| | | | |
|---|---|---|---|
| 4,109,248 A * | 8/1978 | Knowles | G01S 13/762 342/40 |
| 4,115,771 A | 9/1978 | Litchford | |
| 4,319,243 A * | 3/1982 | Vachenauer | G01S 13/78 342/37 |

(Continued)

OTHER PUBLICATIONS

"Minimum Operational Performance Standards for Air Traffic Control Radar Beacon System / Mode Select (ATCRBS /Mode S) Airborne Equipment", RTCA, Inc., RTCA DO-181E, Washington, DC, Mar. 17, 2011.

(Continued)

*Primary Examiner* — Olumide Ajibade Akonai
(74) *Attorney, Agent, or Firm* — IP-Mex Inc.; Victoria Donnelly

(57) ABSTRACT

The present invention provides a low-cost and low-volume mode A/C/S transponder positioning system to detect the position of a target aircraft, or intruder, outside the range of a secondary surveillance radar system. The system uses a signal of the intruder to pinpoint the location of the intruder. The system can be used on both the ground and on an aircraft in a full 360 degree range around the system.

26 Claims, 19 Drawing Sheets

(56) References Cited

U.S. PATENT DOCUMENTS

| | | | |
|---|---|---|---|
| 4,418,349 A * | 11/1983 | Hofgen | G01S 13/003 342/56 |
| 4,481,349 A | 11/1984 | Marten et al. | |
| 4,782,450 A | 11/1988 | Flax | |
| 4,910,526 A | 3/1990 | Donnangelo et al. | |
| 5,173,706 A | 12/1992 | Urkowitz | |
| 5,196,856 A | 3/1993 | Litchford et al. | |
| 5,198,823 A | 3/1993 | Litchford | |
| 6,285,318 B1 | 9/2001 | Schoen | |
| 6,344,820 B1 | 2/2002 | Shiomi et al. | |
| 6,985,103 B2 | 1/2006 | Ridderheim et al. | |
| 7,570,194 B2 | 8/2009 | Galati | |
| 7,800,541 B2 * | 9/2010 | Moshfeghi | G01S 13/38 342/422 |
| 9,218,741 B2 | 12/2015 | Wu | |
| 9,250,317 B1 | 2/2016 | Wang | |
| 9,291,699 B2 * | 3/2016 | Sadr | G01S 5/12 |
| 9,734,723 B1 | 8/2017 | Bruno et al. | |
| 10,743,141 B2 * | 8/2020 | Fairbanks | H04W 4/029 |
| 2013/0009823 A1 * | 1/2013 | Wang | G01S 13/91 342/464 |
| 2013/0176163 A1 | 7/2013 | Margolin | |
| 2015/0331099 A1 | 11/2015 | Wu | |
| 2016/0025849 A1 | 1/2016 | Wang | |
| 2016/0033630 A1 | 2/2016 | Harvey | |
| 2018/0172797 A1 | 6/2018 | Hauswald et al. | |

OTHER PUBLICATIONS

Shiomi et al, "Development of Mobile Passive Secondary Surveillance Radar", ICAS 2012, 28th International Congress of the Aeronautical Sciences, pp. 1-6.

Shiomi et al, "Development of Passive Surveillance Radar", ICAS 2014, 29th Congress of the International Council of the Aeronautical Sciences, pp. 1-9.

RTCA Paper No. 256-20/SC228-076, "Minimum Operational Performance Standards (MOPS) for Detect and Avoid (DAA) Systems", RTCA DO-365B, Prepared by SC-228 (Sep. 16, 2020), online: www.rtca.org.

* cited by examiner

MODE A/C/S TRANSPONDER POSITIONING SYSTEM AND METHOD FOR USING THE SAME

FIELD OF THE INVENTION

The invention provides a low-cost and low-volume mode A/C/S transponder positioning system which can be used on both the ground and on an aircraft, and provides a full 360 degree range of coverage.

BACKGROUND OF THE INVENTION

A mode A/C/S transponder ("transponder") is equipped by 99% of the manned aircraft and is required for any aircraft flying around the airport. The position of the transponder can be determined with the help of secondary surveillance radar ("SSR") system of the airport. It is difficult to determine the position of the transponder outside of the range of SSR coverage. Moreover, in small airport where the SSR is not installed, the position of the transponder equipped aircraft cannot be determined. This presents hazards to modern aviation.

One method of the prior art is to use three broadcasting stations, each having an omnidirectional antenna. The corresponding distance between the intruder, or target aircraft, and the three stations $d_1$ 33, $d_2$ 37a and $d_3$ 38a have to be measured, separately. The combination of the three omnidirectional measurements is used to pinpoint the position of the intruder. In this technology, the transmission time of each station should be controlled carefully to avoid ambiguity.

Comparatively, a traffic collision avoidance system (TCAS) is a mid-air collision avoidance system imitating the SSR principle, which is designed to operate outside the range of SSR, or where SSR is not present. However, TCAS cannot be used on the ground, and sometimes only covers a limited range of angles around the aircraft each time it interrogates. Moreover, few aircraft (especially amateur aircraft) are equipped with TCAS, which reduces its capability.

Therefore there is a need in the industry for an improved mode A/C/S transponder positioning system which can operate outside the range of SSR coverage of an airport, and may be employed on the ground with a full range of coverage.

SUMMARY

It is an object of the present invention to provide an improved mode A/C/S transponder positioning system and method which can operate outside the range of SSR coverage of an airport.

According to one aspect of the invention, there is provided a system for determining a location of an intruder in airspace, comprising:
  an antenna one, spaced apart at a baseline distance from an antenna two, along a baseline, and the antenna two being spaced apart at a sub wavelength distance from an antenna three, the antenna three being disposed off the baseline;
  the antenna one being configured to send an interrogation signal;
  the antenna one, the antenna two and the antenna three being configured to receive a reply signal from the intruder, in response to the interrogation signal;
  the system being further configured to:
    determine two possible locations of the intruder, using the reply signal of the intruder, received at the antenna one and at the antenna two, respectively; and
    discriminate between the two possible locations of the intruder, using the reply signal received at the antenna two and at the antenna three, thereby determining the location of the intruder.

The system is further configured to:
  measure a first transit time and a second sum time representing times of transit of the reply signal from the intruder to the station one, and the sum time the signal transmit from station one to the intruder and from the intruder to the station two, respectively;
  determine a first distance from the intruder to the antenna one, and a second sum distance from the antenna one to the intruder and from the intruder to the antenna two, by using the first transit time and the second sum time, respectively; and
  determine the two possible locations of the intruder, each location being at intersection of a circle with a radius equal to the first distance and an ellipse formed using the antenna one and the antenna two as two focal points.

The system further comprises a first and a second global positioning systems (GPS), respectively located near the antenna one, and near the antennas two and three, to determine the first transit time, and second sum time, respectively.

The system is further configured to:
  measure a first phase of the reply signal received by the antenna two, and a second phase of the reply signal received by the antenna three, and determine a phase difference between the first phase and the second phase.

The system is further configured to:
  demodulate the reply signal received by the antenna one containing the first phase and the reply signal received by the antenna two containing the second phase, to generate a first intermediate frequency signal and a second intermediate frequency signal, respectively;
  digitize the first intermediate frequency signal and the second intermediate frequency signal;
  correlate the digitized first intermediate frequency signal and the digitized second intermediate frequency signal, thereby determining the phase difference.

The system is further configured to:
  choose one of the two possible locations, provided the second phase is leading as compared to the first phase by using the phase difference; and
  choose another of the two possible locations, provided the second phase is lagging as compared to the first phase by using the phase difference.

In the system described above, the sub-wavelength distance as one of the following:
  less than about half of a wavelength of the reply signal;
  about half of the wavelength of the reply signal.

In the system described above, the antenna one, the antenna two and the antenna three are disposed as one of the following:
  the antenna one, the antenna two, and the antenna three on a ground;
  the antenna one, the antenna two, and the antenna three on an aircraft;
  the antenna one on the ground, and the antenna two and the antenna three on the aircraft;
  the antenna one on the aircraft, and the antenna two and the antenna three on the ground.

The system is configured to send and receive Automatic Dependent Surveillance-Broadcast (ADS-B) signals.

According to another aspect of the invention, there is provided, in a system for determining a location of an intruder in airspace, comprising an antenna one, spaced apart at a baseline distance from an antenna two, along a baseline, and the antenna two being spaced apart at a sub wavelength distance from an antenna three, the antenna three being disposed off the baseline; the antenna one having means for sending an interrogation signal; the antenna one, the antenna two and the antenna three having respective means for receiving a reply signal from the intruder, in response to the interrogation signal, a data processing unit having computer readable instructions stored thereon for execution by a processor, causing the processor to:
determine two possible locations of the intruder, using the reply signal of the intruder, received at the antenna one and at the antenna two, respectively; and
discriminate between the two possible locations of the intruder, using the reply signal received at the antenna two and at the antenna three, thereby determining the location of the intruder.

According to yet another aspect of the invention, there is provided a method of determining a location of an intruder in airspace, comprising:
sending an interrogation signal from an antenna one, spaced apart at a baseline distance from an antenna two, along a baseline, and the antenna two being spaced apart at a sub wavelength distance from an antenna three, the antenna three being disposed off the baseline;
receiving a reply signal from the intruder at the antenna one, at the antenna two and at the antenna three, in response to the interrogation signal;
determining two possible locations of the intruder, using the reply signal of the intruder, received at the antenna one and at the antenna two, respectively; and
discriminating between the two possible locations of the intruder, using the reply signal received at the antenna two and at the antenna three, thereby determining the location of the intruder.

The method further comprises:
measuring a first transit time and a second sum time representing times of transit of the reply signal from the intruder to the station one, and the sum time the signal transmit from station one to the intruder and from the intruder to the station two, respectively;
determining a first distance from the intruder to the antenna one, and a second sum distance from the antenna one to the intruder and from the intruder to the antenna two, by using the first transit time and the second sum time, respectively; and
determining the two possible locations of the intruder, each location being at intersection of a circle with radius equal to the first distance and an ellipse formed using the antenna one and the antenna two as two focal points.

The method further comprises determining the first transit time, and second sum time by a first and a second global positioning systems (GPS), respectively located near the antenna one, and near the antennas two and three.

The method further comprises measuring a first phase of the reply signal received by the antenna two, and a second phase of the reply signal received by the antenna three, and determining a phase difference between the first phase and the second phase.

The method further comprises:
demodulating the reply signal received by the antenna one containing the first phase and the reply signal received by the antenna two containing the second phase, to generate a first intermediate frequency signal and a second intermediate frequency signal, respectively;
digitizing the first intermediate frequency signal and the second intermediate frequency signal; and
correlating the digitized first intermediate frequency signal and the digitized second intermediate frequency signal, thereby determining the phase difference.

The method further comprises:
choosing one of the two possible locations, provided the second phase is leading as compared to the first phase by using the phase difference; and
choosing another of the two possible locations, provided the second phase is lagging as compared to the first phase by using the phase difference.

The method further comprises choosing the sub-wavelength distance as one of the following:
less than about half of a wavelength of the reply signal;
about half of the wavelength of the reply signal.

The method further comprises disposing the antenna one, the antenna two and the antenna three as one of the following:
the antenna one, the antenna two, and the antenna three on a ground;
the antenna one, the antenna two, and the antenna three on an aircraft;
the antenna one on the ground, and the antenna two and the antenna three on the aircraft;
the antenna one on the aircraft, and the antenna two and the antenna three on the ground.

The method further comprises disposing the antenna two and the antenna three, such that:
a line connecting the antenna two and the antenna three forms about a 90 degree angle with the baseline;
the line connecting the antenna two and the antenna three forms a non-perpendicular angle with the baseline.

In the method described above, the sending and the receiving comprise sending and receiving Automatic Dependent Surveillance-Broadcast (ADS-B) signals.

Thus, an improved system and method of detecting the location of an intruder in airspace are provided.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION OF THE EMBODIMENTS

Figure 1A:
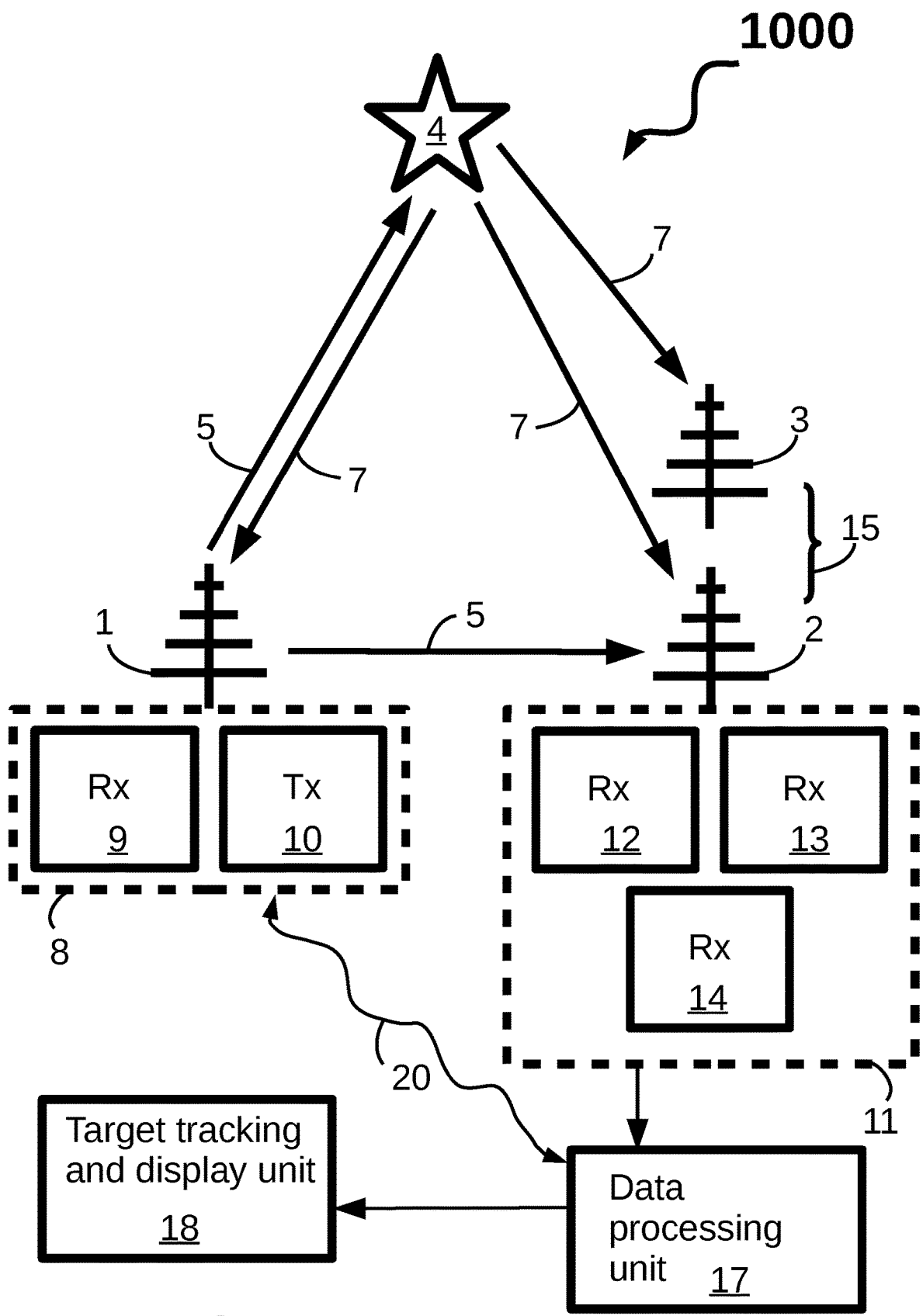
FIG. 1A is schematic diagram of the system 1000, showing the relationship to the intruder 4.

The schematic block diagram of the mode A/C/S transponder positioning system 1000 for detection of an intruder 4, or target aircraft, is shown in FIG. 1A. The system 1000 comprises two stations separated from one another: station one 8, comprising antenna one 1, and station two 11, comprising the antenna two 2 and antenna three 3.

The system 1000 further comprises a data processing unit 17, which receives data from the station one 8 and the two 11, and a target tracking and display unit 18, which receives data from the data processing unit 17. The station one 8 and the data processing unit 17 share range information 20.

The first station, station one 8, is equipped with a single channel receiver (Rx) 9, centred at 1090 MHz, and a single channel transmitter (Tx) 10, centred at 1030 MHz. The second station, station two 11, has a first Rx channel 12, a second Rx channel 13 and a third Rx channel 14. Two of the three channels are centered at 1090 MHz, and the remaining channel is centred at 1030 MHz.

Figure 1B:
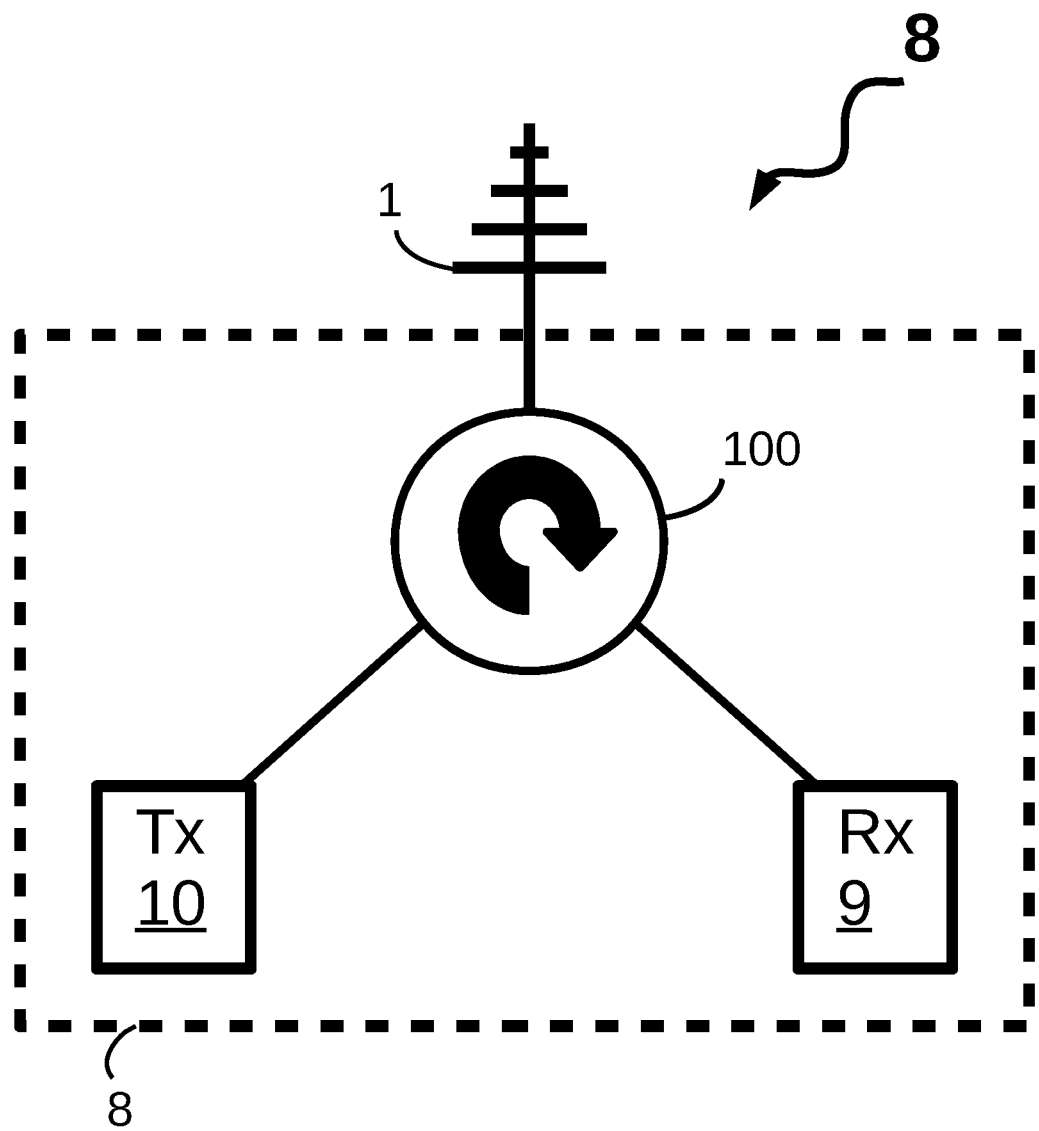
FIG. 1B is a schematic diagram of the station one 8, showing the structural relationship between the antenna one 1 and the single channel transmitter (Tx) 10 and single channel receiver (Rx) 9.

At station one 8, the single channel transmitter (Tx) 10 and single channel receiver (Rx) 9 can share the antenna one 1 through a circulator 100 in order to use only one antenna at station one 8, as shown in FIG. 1B.

Station one 8 transmits mode A/C/S interrogation signal ("interrogation signal") 5 at 1030 MHz with a given or random pulse repetition frequency (PRF). This interrogation signal can be received by both the target aircraft, or intruder 4, and station two 11.

Figure 1C:
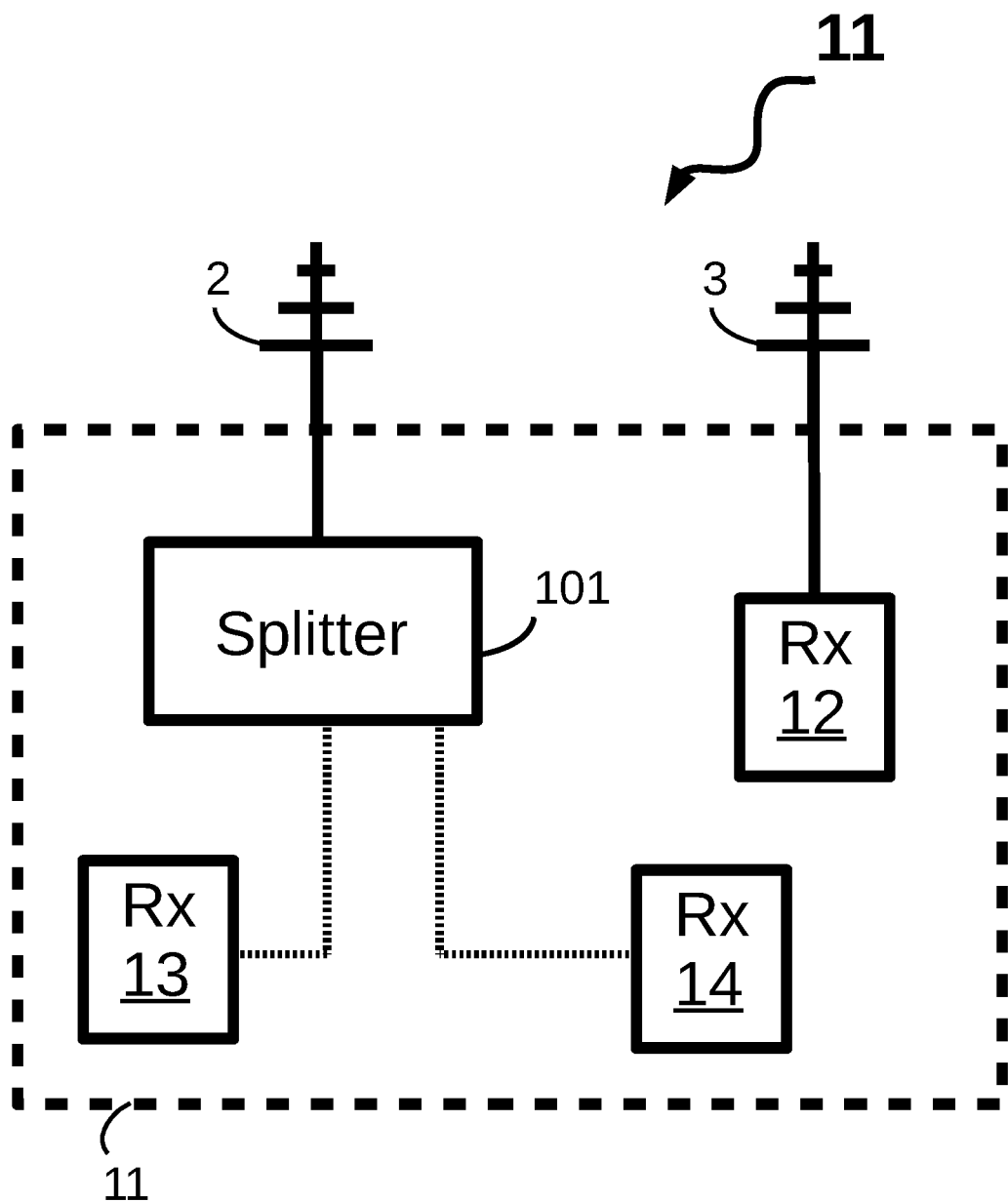
FIG. 1C is a schematic diagram of the station two 11, showing the structural relationship between the antenna two 2 and antenna three 3, and the single channel receiver 12, single channel receiver 13 and single channel receiver 14.

Separated antennas can also be used for the single channel transmitter (Tx) 10 and single channel receiver (Rx) 9 to improve device sensitivity. At station two 11, one 1090 MHz receiving channel is connected to an omni-directional antenna (antenna three 3), and the other two receiving channels share one receiving antenna (antenna two 2) using a splitter 101, as shown in FIG. 1C. As an example, in FIG. 1C, the Rx 12 has been shown to be connected to antenna three 3, while Rx 13 and Rx 14 share antenna two 2 through a splitter 101. The antenna two 2 and antenna three 3 at station two 11 should be separated by a sub-wavelength distance 15, for example preferably a half wavelength separation distance corresponding to 1090 Mhz frequency, or another distance which is smaller than a wavelength. The splitter 101 is used to connect two single channel receivers Rx 13 and 14 to a single antenna two 2. Without the splitter 101, Rx 13 and 14 need to be connected to separate antennas. The two single channel receivers Rx 13 and 14 connected to the antenna two 2 have different centre frequencies. Rx 13 is centred on 1030 Mhz to receive the interrogation signal from the station one 8 for synchronization purpose. The other Rx 14 is centred on 1090 Mhz to receive reply signal from the intruder 4.

Figure 1D:
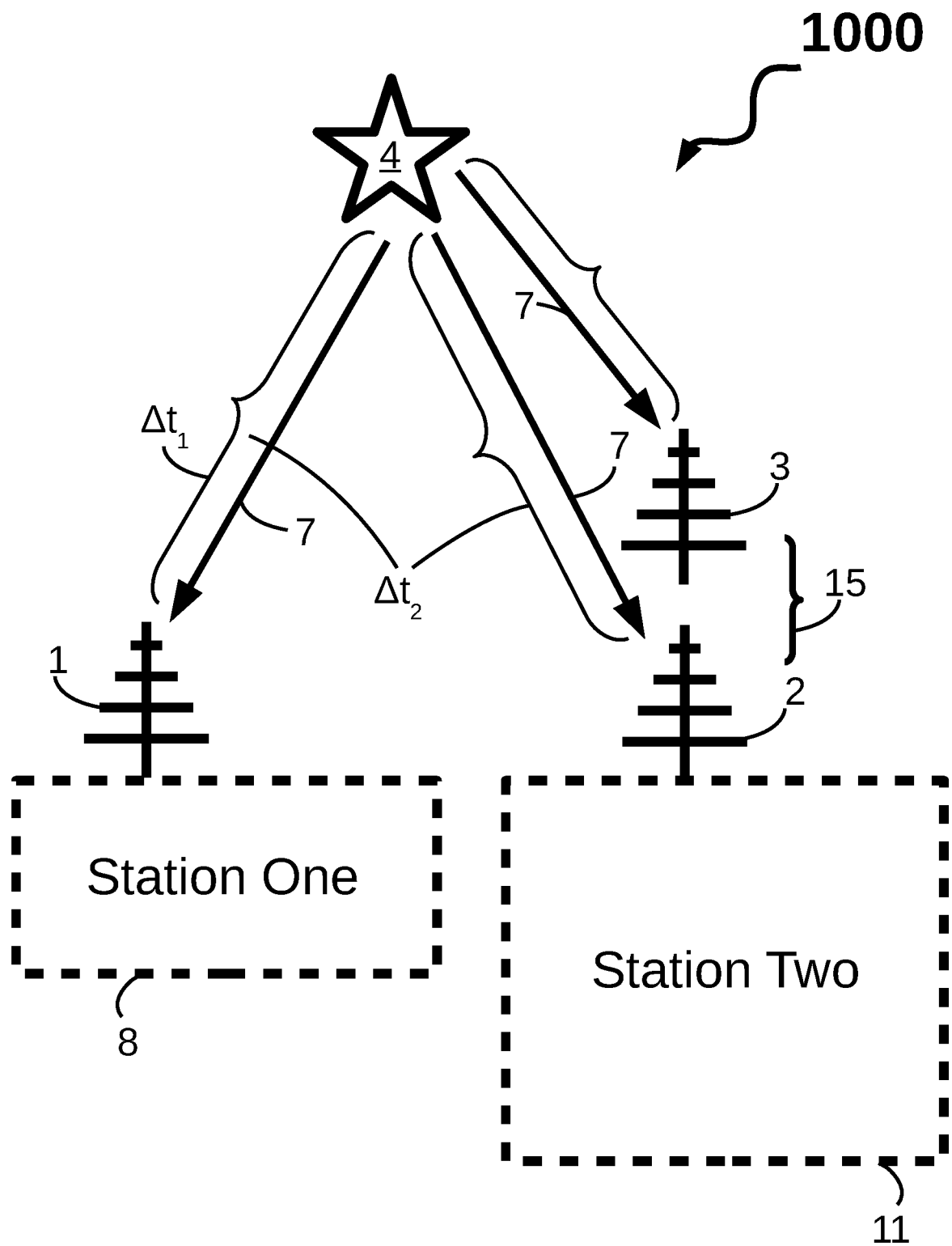
FIG. 1D is a schematic diagram of the system 1000, showing the times at which the reply signal 7 is received by antenna one 1, the sum time that the interrogation signal travels from antenna one 1 to intruder 4 and from intruder 4 to antenna two 2.

The interrogation signal 5 from the station one 8 will trigger the 1090 MHz Mode A/C/S reply ("reply signal") 7 from the target aircraft, or intruder 4. As shown in FIG. 1D, this reply signal 7 can be received by antenna one 1, antenna two 2 and antenna three 3, at time $t_1$, $t_2$ and $t_3$ respectively. The reply includes the squawk code and the altitude information of the intruder 4. The squawk code will be used to track the same intruder 4, and the altitude information will reduce the problem from three dimensional (3D) to two dimensional (2D).

The configuration of antenna one 1, antenna two 2 and antenna three 3 is such that antenna one 1 may send an interrogation signal 5 to the intruder 4, and may receive a reply signal 7 from the intruder 4 to the antenna one 1.

Figure 2A:
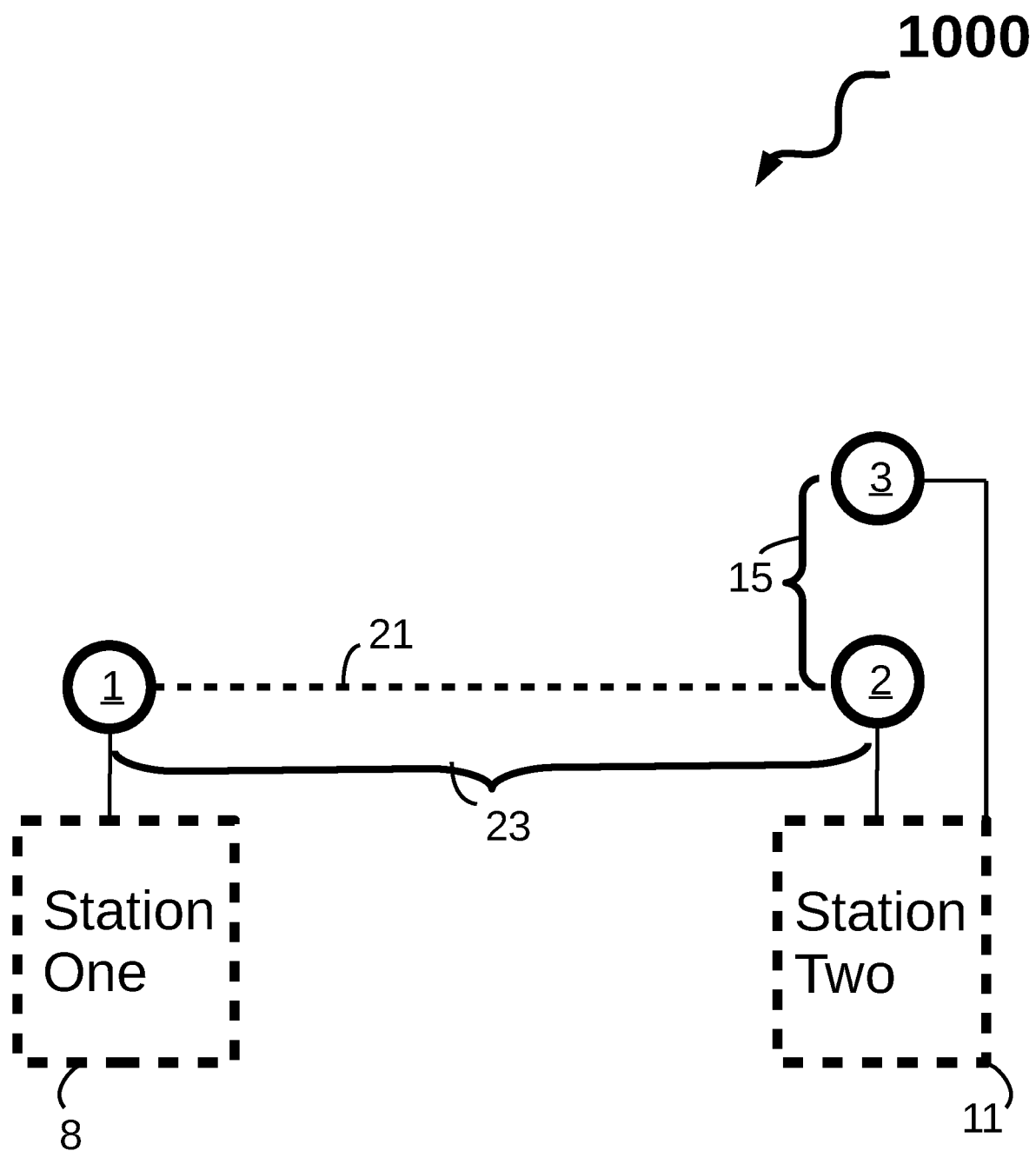
FIG. 2A is a simplified schematic of the system 1000 from a top view.
Figure 2B:
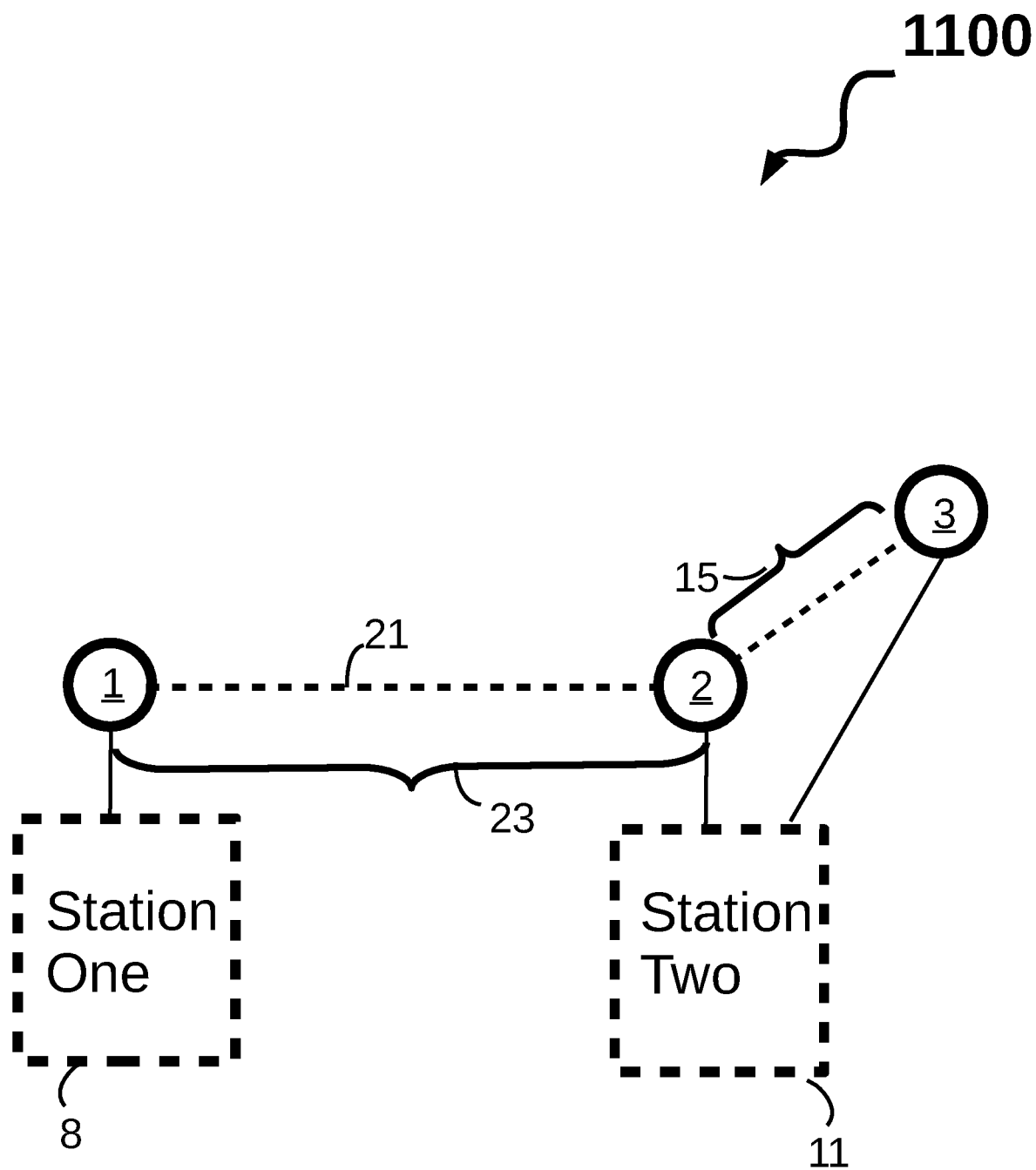
FIG. 2B is a simplified schematic view of system 1100 from a top view.

In the preferred embodiment, the sub-wavelength distance 15 is 13.76 cm, and the antenna three 3 is positioned 90 degrees from the station two 11, such that an imaginary line connecting antenna three 3 and antenna two 2 is perpendicular to the baseline 21 (shown in FIG. 2A). However, in another embodiment of the present invention, shown in system 1100 of FIG. 2B, antenna two 2 and antenna three 3 are configured such that an imaginary line connecting the antenna two 2 and antenna three 3 forms a non-perpendicular angle with the baseline 21.

FIG. 2A shows a simplified schematic of the system 1000 from a top view. The baseline 21 connects antenna one 1 with the antenna two 2. A length 23 of the baseline 21 should be much longer, for example, 10 times longer, than an error of distance measurements. The error of the distance measurement depends on the system and methods used to measure the range. It is better to use high accuracy range measurement if the space to place station one and two is tight. Generally, the longer the baseline 21, the better the positioning accuracy of the system 1000.

Figure 2C:
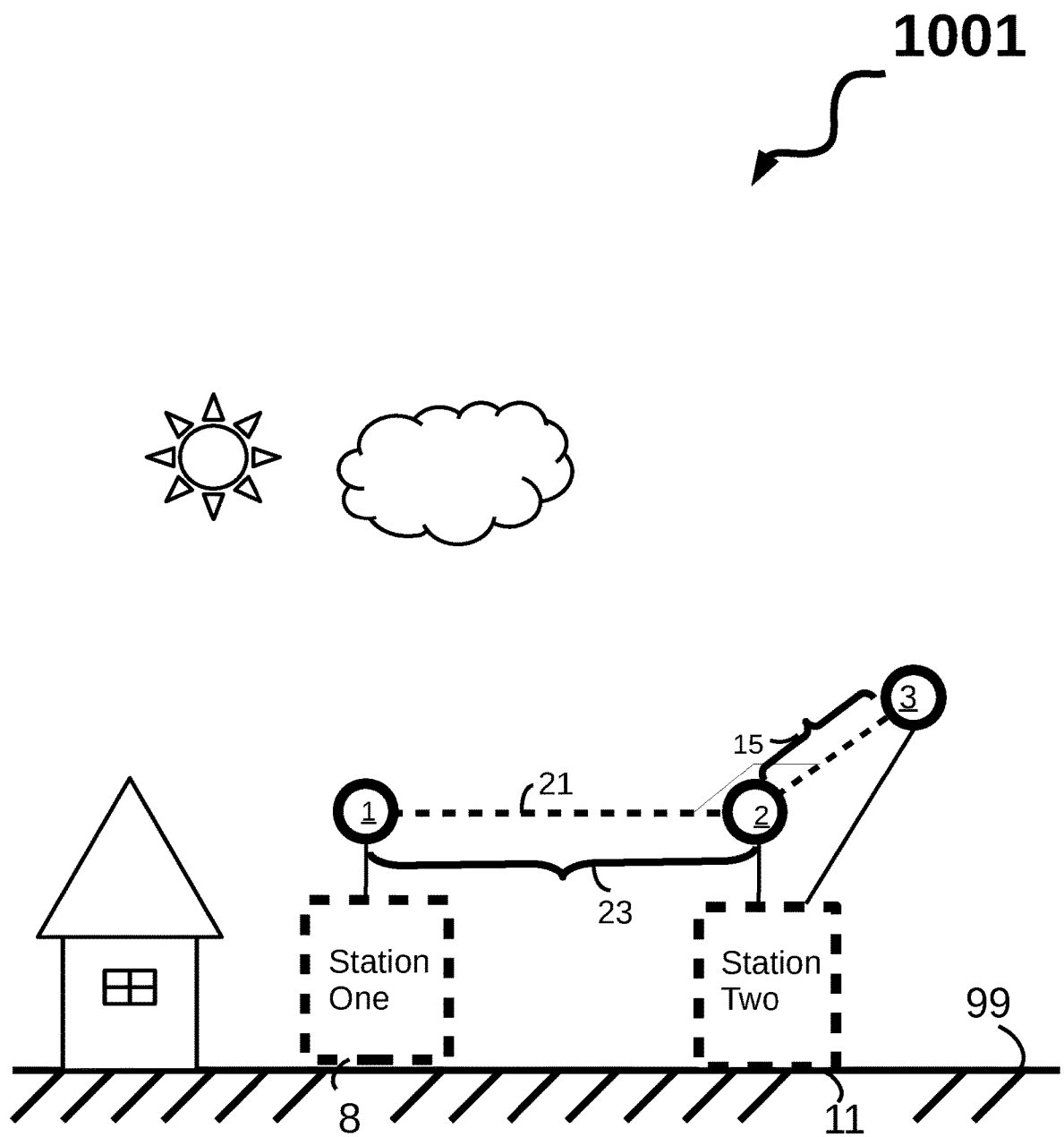
FIG. 2C is a simplified schematic view of system 1001 from an eye level view.

In one embodiment, shown in FIG. 2C depicting the system 1001, all three antennas 1, 2 and 3 of the system 1000 are set up on the ground, such that antenna one 1 is on the ground, and antenna two 2 and antenna three 3 are also on the ground 99. Please note FIG. 2C is depicted as if viewed from eye level. Antenna two 2 and three 3 are on the same height. Note there is a right angle symbol between the horizontal line and the line connecting antenna two 2 and three 3, which means we use the antenna configuration in FIG. 2A, but viewed from a different angle. FIG. 2C to FIG. 2F are plotted in the same way, and the imaginary line connecting antenna two 2 and antenna three 3 is all perpendicular to the baseline 21.

Figure 2D:
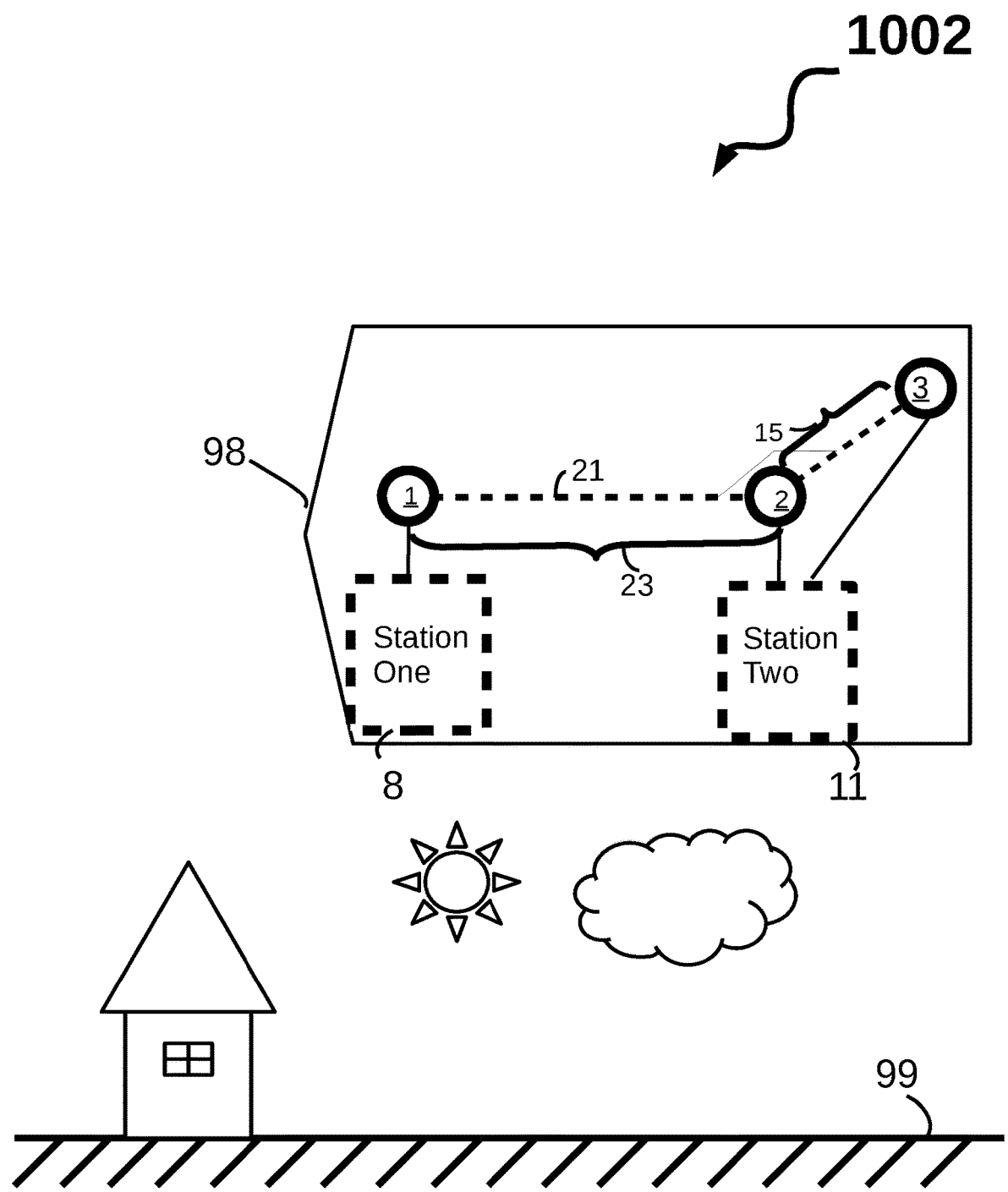
FIG. 2D is a simplified schematic view of system 1002 from an eye level view.

In another embodiment, shown in FIG. 2D depicting the system 1002, all three antennas of the system 1000 are set up on the aircraft, such that the antenna one 1 is on the aircraft, and antenna two 2 and antenna three 3 are also on the aircraft 98.

Figure 2E:
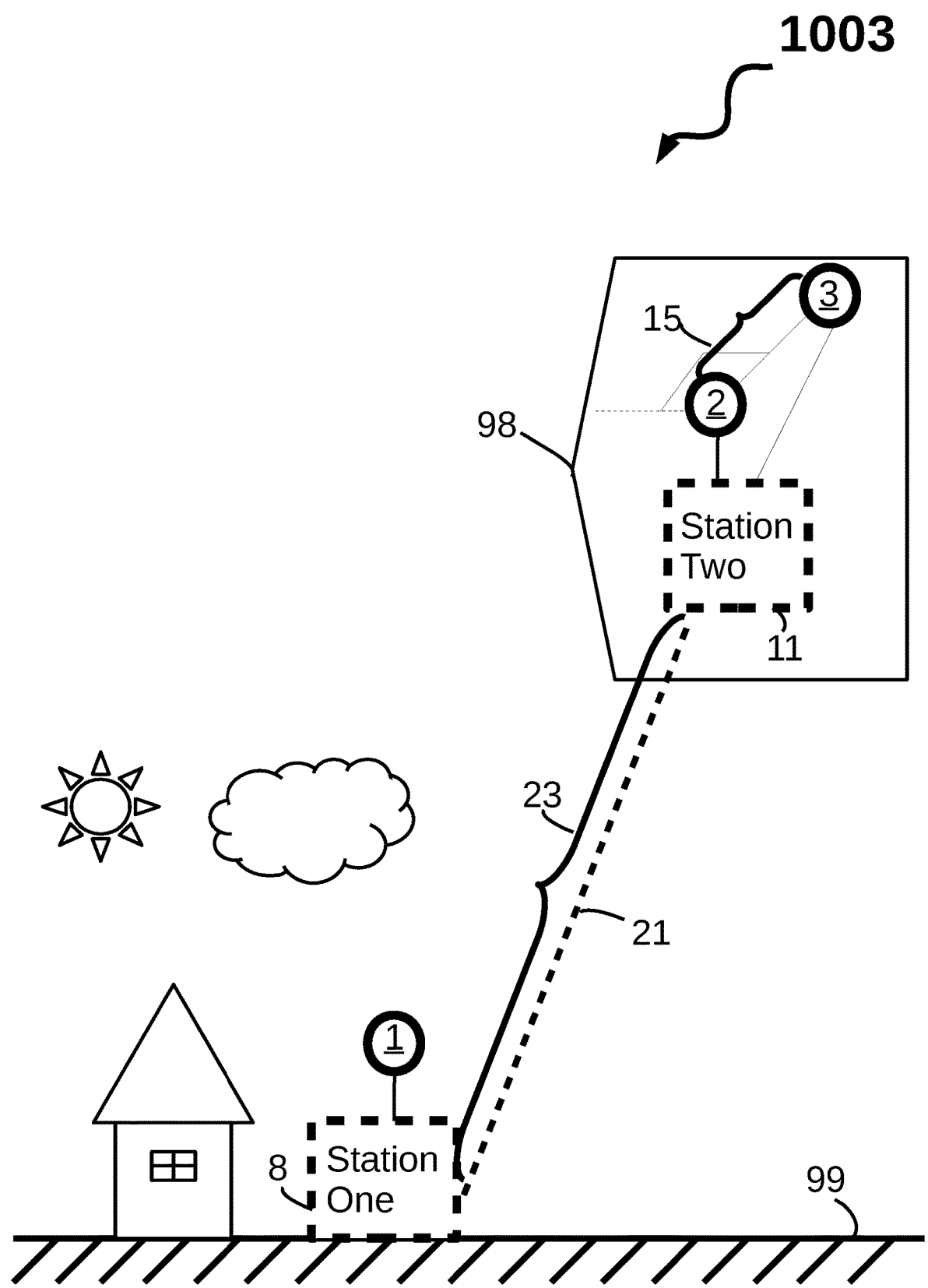
FIG. 2E is a simplified schematic view of system 1003 from an eye level view.

In a further embodiment, shown in FIG. 2E depicting the system 1003, the antenna one 1 of the system 1000 is on the ground 99, and antenna two 2 and antenna three 3 are all on the aircraft 98.

Figure 2F:
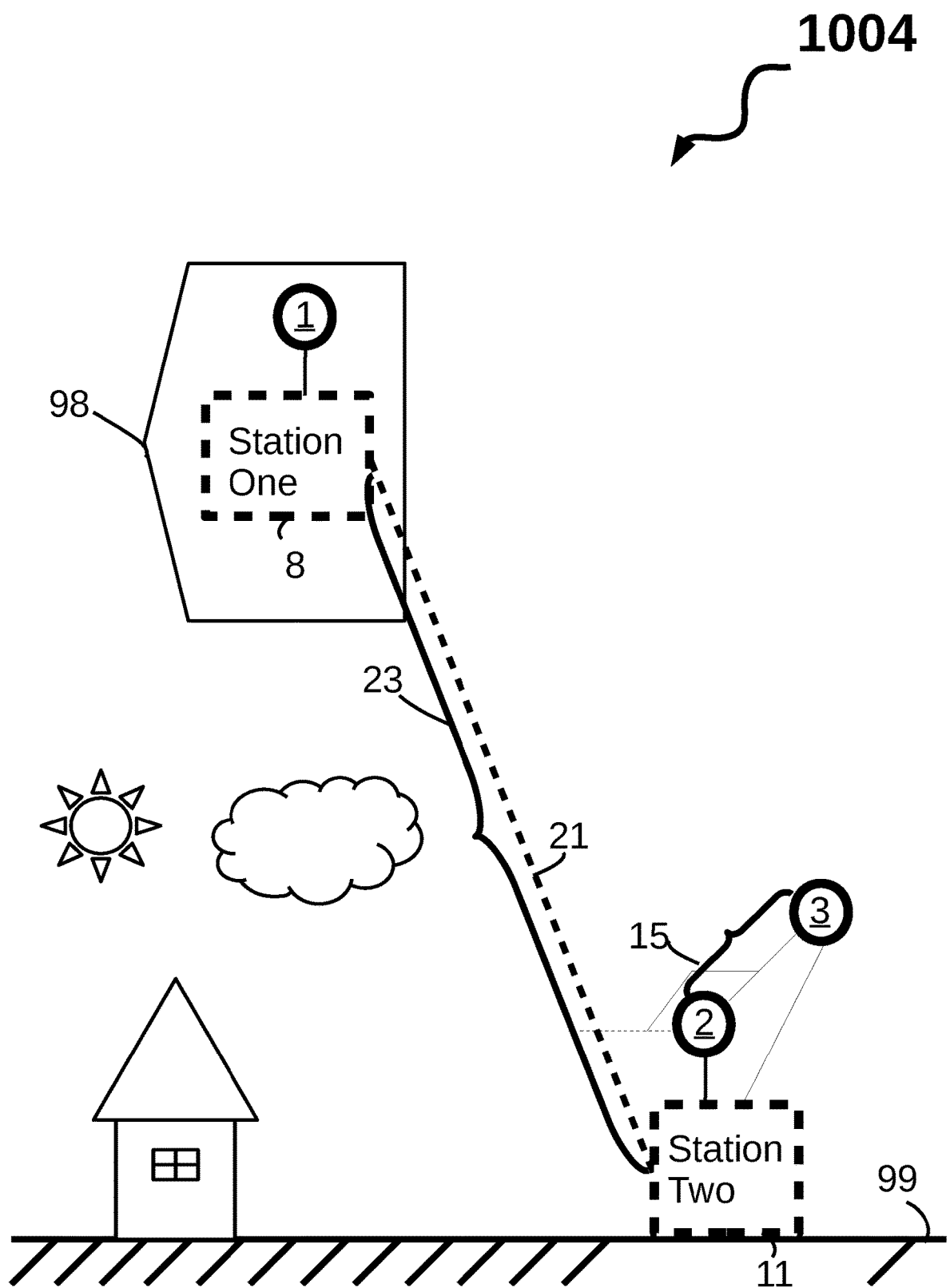
FIG. 2F is a simplified schematic view of system 1004 from an eye level view.

In a further embodiment, shown in FIG. 2F depicting the system 1004, the antenna one 1 of the system 1000 is on the aircraft, and antenna two 2 and antenna three 3 are on a ground.

In the above noted embodiments where the system 1000 is set up on the ground, the baseline 21 may be hundreds of meters long. If the system 1000 is set up on the aircraft, the baseline 21 should be set as the longest separation available on the aircraft.

As an example, if station two 11 receives the interrogation signal 5 at initial time $t_{01}$, then the transmission time $t_0$, for each interrogation signal 5 from station one 8 can be calculated as follows:

$$t_0 = t_{01} - D/c \qquad (0)$$

where D is the distance 21 between the station one 8 and the station two 11 and is known, and c is the speed of light.

For the antenna one 1, because the transmission time to is known, the distance between the station one 8 and the intruder 4, of the first distance, can be calculated as follows:

$$d_1 = (t_1 - t_0 - \tau) \cdot c/2 \qquad (1)$$

where $\tau$ is a fixed time delay within the transponder, $t_1$ is the time when the station one 8 receives the reply message from the intruder 4. The value of $d_1$ 33 is forwarded to the data processing unit 17 (FIG. 1) after being acquired.

Assuming the distance between the intruder 4 and station two 11 is $d_2$ 37a, then by knowing time $t_2$, the sum d of $d_1$ 33 and $d_2$ 37a can be calculated as:

$$d = d_1 + d_2 = (t_2 - t_0 - \tau) \cdot c \qquad (2)$$

d 30 gives an ellipse 31 with antenna one 1 and antenna two 2 as two focuses. The Cartesian coordinate system uses antenna one 1 as the origin, and the baseline 21 as x-axis 32. The expression of the ellipse 31 can be determined by using the baseline length 21 and the value d 30 calculated above.

Figure 3:
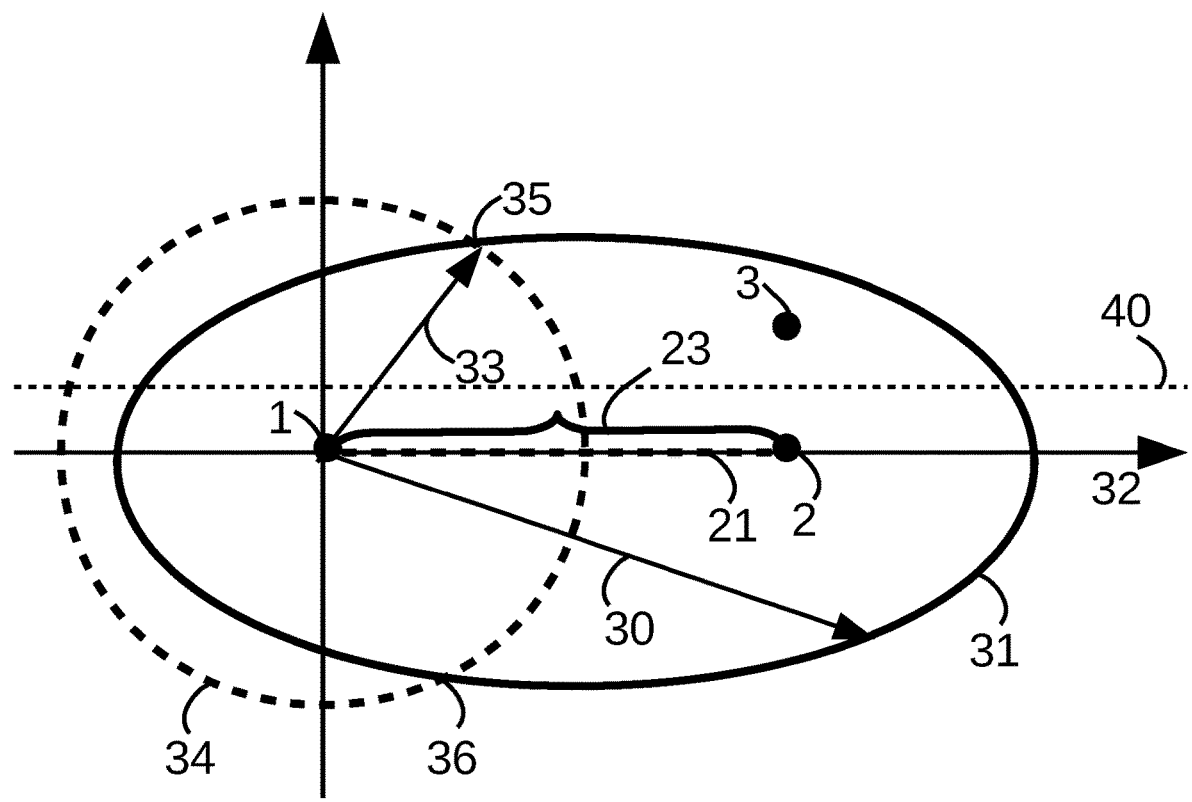
FIG. 3 is a schematic illustration using analytical geometry drawing of the equation (2)

The $d_1$ 33 gives a circle 34 with radius $d_1$ 33, centred at antenna one 1. There are maximum two possible intersections between the circle 34 and the ellipse 31, at points 35 and 36. The intruder 4 will be located in one of the two intersections at points 35 and 36, giving two possible locations of the intruder. FIG. 3 illustrates the circle 34 acquired from the distance from equation (1) and the ellipse acquired from the distance from equation (2). The intersections between the circle 34 and the ellipse 31 provide the possible locations of the intruder 4. Because the altitude of the intruder 4 can be determined by its Mode C reply message, the 3D problem can be reduced to a 2D problem. This is why a 2D coordinates is used in FIG. 3 and FIG. 4.

The antenna three 3, as shown in FIG. 3, is used to determine which one of points 35 or 36, or which of the two possible locations of the intruder 4, is actually the position of the intruder. The separation between antenna two 2 and antenna three 3 is half of the wavelength of the 1090 MHz signal in a general configuration.

The first phase is denoted as the phase of the reply signal 7 received at the antenna two 2, while the second phase is denoted as the phase of the reply signal 7 received at the antenna three 3. A phase difference is denoted as the difference between the first phase and the second phase.

Figure 4A:
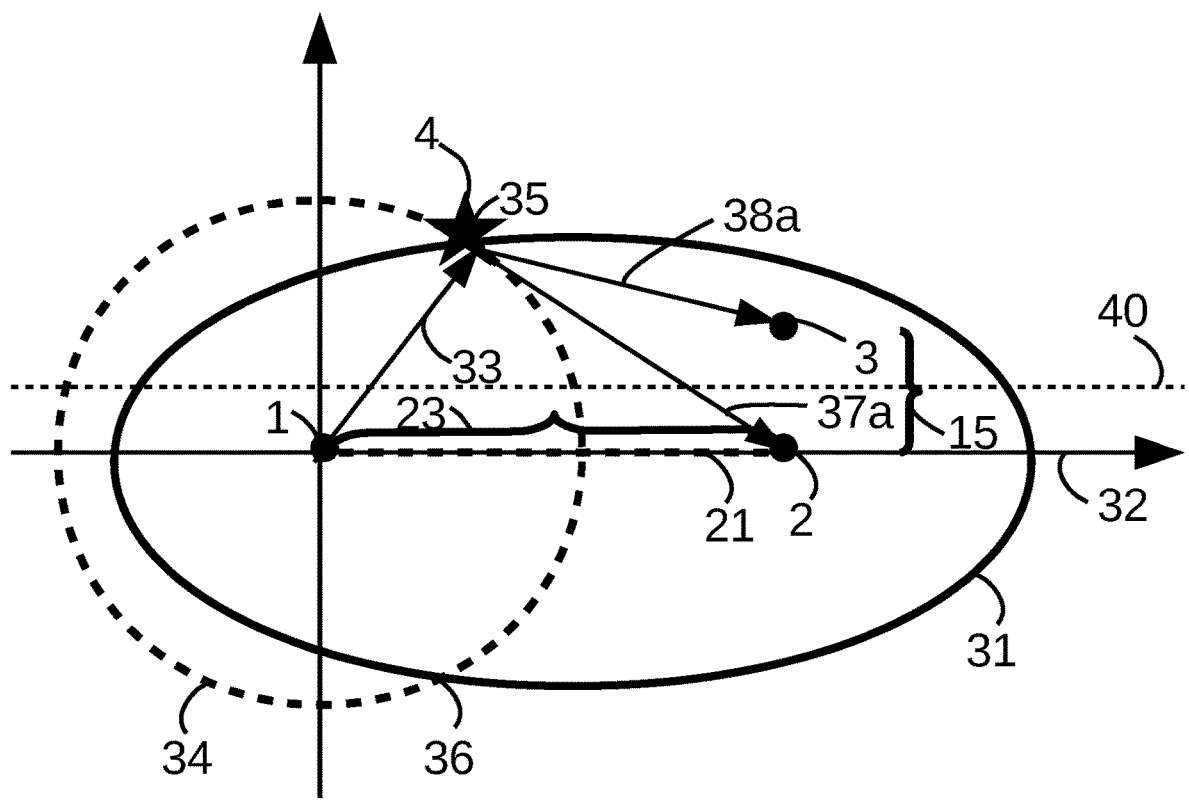
FIG. 4A is a schematic illustration using analytical geometry drawing of the equation (2) where the intruder 4 is located at point 35.
Figure 4B:
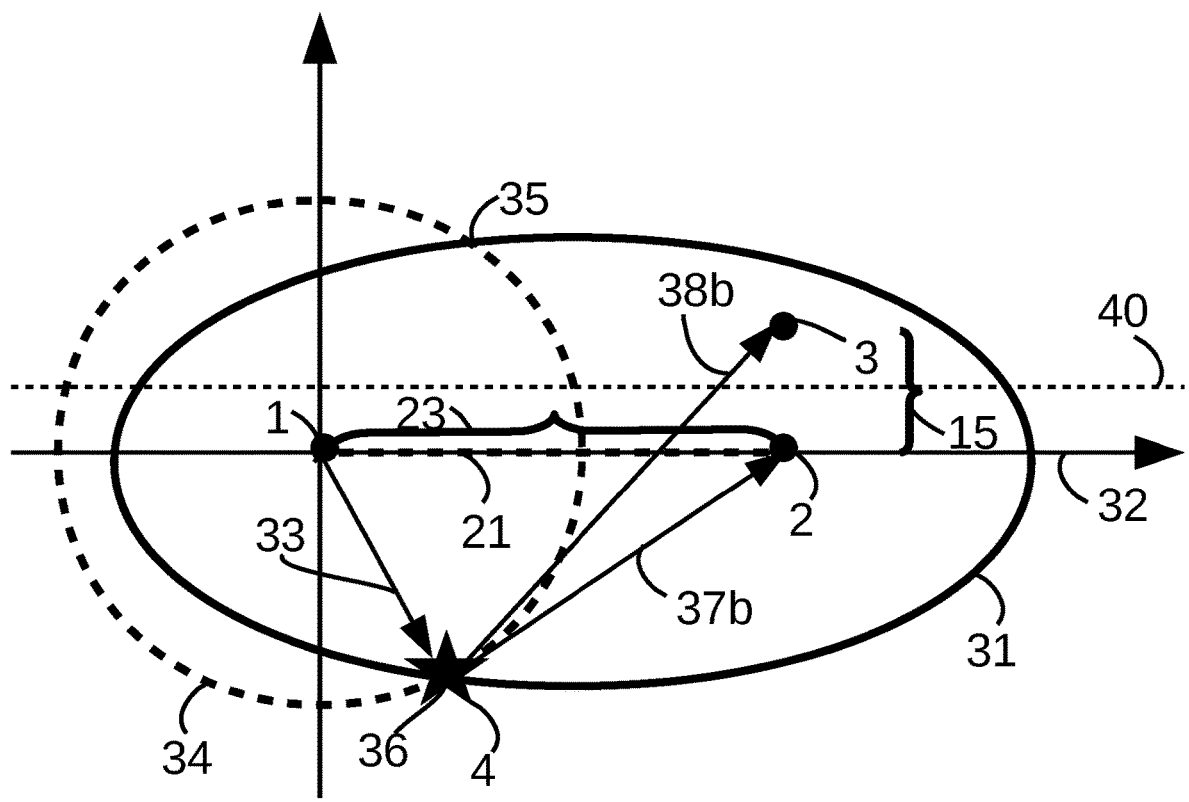
FIG. 4B is a schematic illustration using analytical geometry drawing of the equation (2) where the intruder 4 is located at point 36.

In FIG. 4A and FIG. 4B, the dashed line 40 is drawn equidistant from the antenna two 2 and the antenna three 3. In the configuration of FIG. 4A, the intruder 4 is above the dashed line 40, and is located at point 35, or one of the two possible locations. The difference between the distance $d_2$ 37a and the distance $d_3$ 38a is then less than or equal to the sub-wavelength distance 15 between antenna two 2 and antenna three 3. Also, if the intruder 4 is above the dashed line 40, the distance $d_2$ 37a is always longer than the distance $d_3$ 38a. In this example, the second distance is denoted by distance $d_2$ 37a, and the third distance is denoted by distance $d_3$ 38a. Therefore, if the intruder 4 is above the dashed line 40, the second phase is always leading as compared to the first phase by less or equal to half of the wavelength (180 degrees assuming the distance 15 between antenna two 2 and antenna three 3 is half wavelength).

FIG. 4B shows the other possibility when the intruder 4 is below the dashed line 40, and is located at point 36, or another of the two possible locations. In this example, the second distance is denoted by distance $d'_2$ 37b, and the third distance is denoted by distance $d'_3$ 38b. In this case, because the distance $d'_3$ 38b is always longer than the distance $d'_2$ 37b, the second phase is always lagging as compared to the first phase by less or equal to about half of the wavelength (180 degrees assuming the distance 15 between antenna two 2 and antenna three 3 is half wavelength).

Figure 5A:
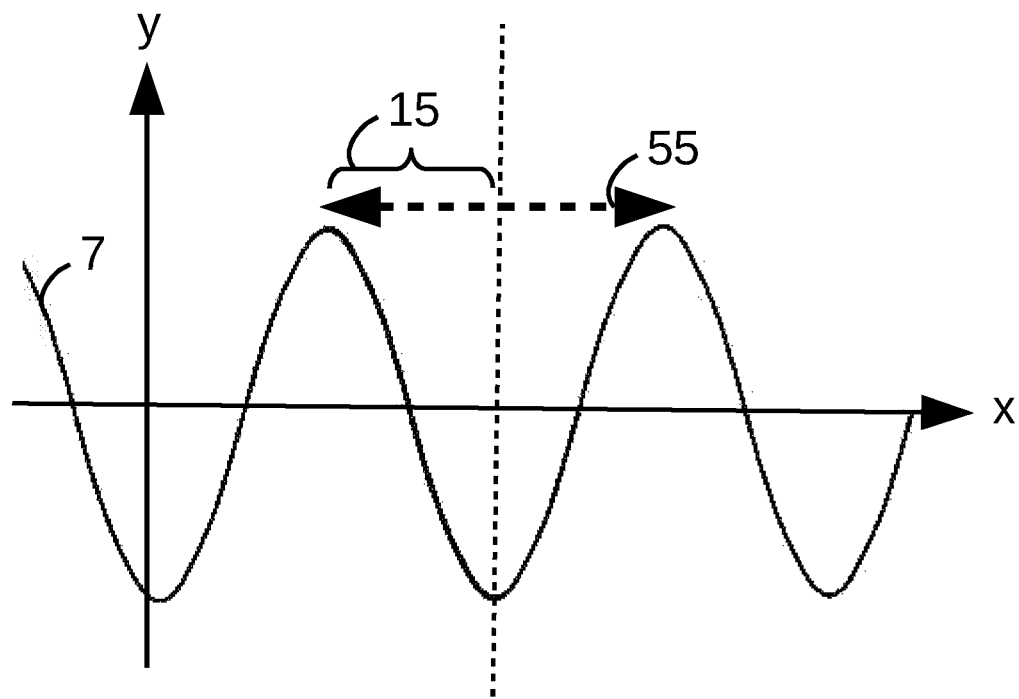
FIG. 5A is a schematic illustration of the sub-wavelength distance 15 in relation to the wavelength 55 of the reply signal 7.

In the preferred embodiment, shown in FIG. 5A, the sub-wavelength distance 15 between the antenna two 2 and antenna three 3 is half the wavelength 55 of the reply signal 7. In practical terms, if the reply frequency is 1090 MHz, the sub-wavelength distance 15 is about 13.76 cm.

Figure 5B:
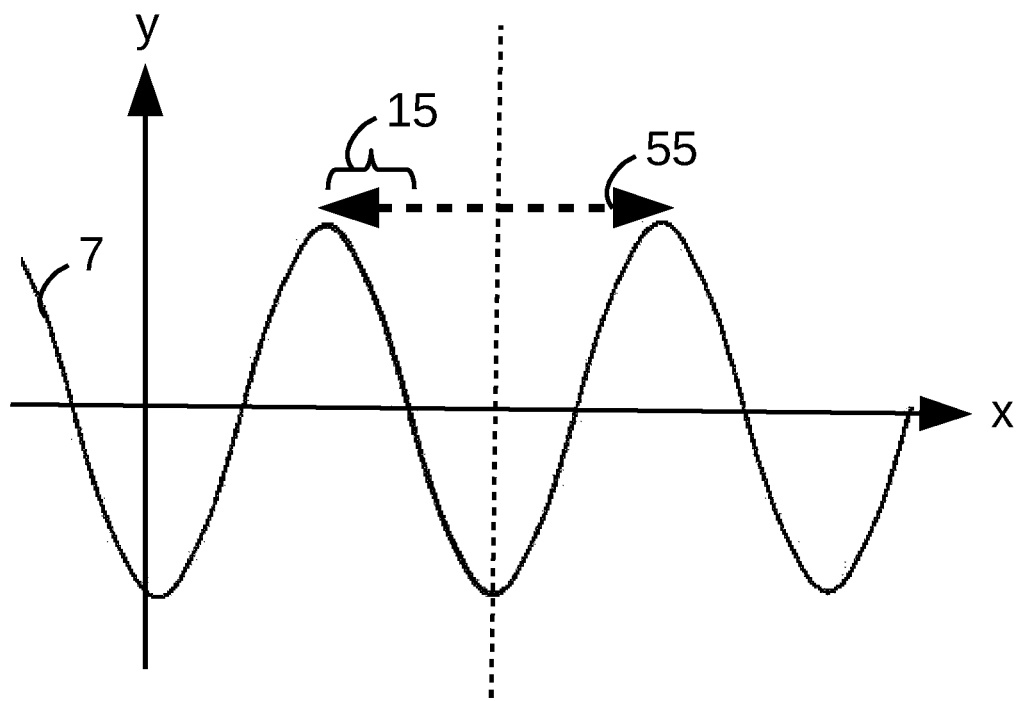
FIG. 5B is a yet another schematic illustration of the sub-wavelength distance 15 in relation to the wavelength 55 of the reply signal 7.

However, in another embodiment of the present invention, shown in FIG. 5B, the sub-wavelength distance 15 between the antenna two 2 and antenna three 3 may be smaller than half of the wavelength 55 of the reply signal 7. While a phase difference created by a sub-wavelength distance 15 of half of the wavelength of the reply signal 7 yields a preferred phase separation, a shorter sub-wavelength distance 15 would yield a phase separation which is also acceptable.

Figure 5C:
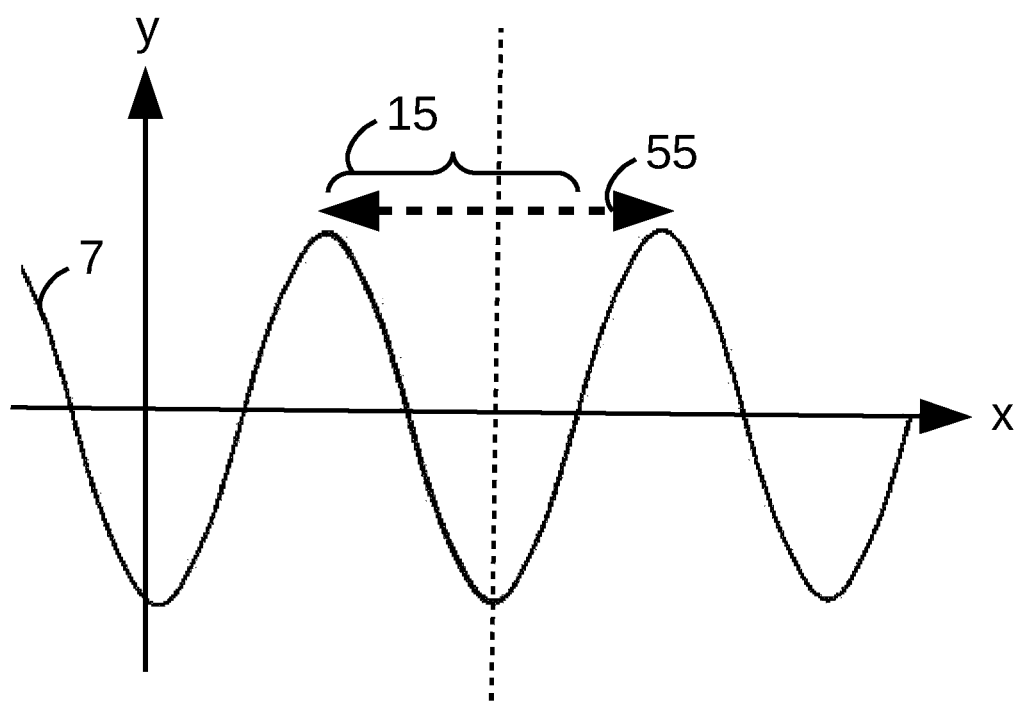
FIG. 5C is a one more schematic illustration of the sub-wavelength distance 15 in relation to the wavelength 55 of the reply signal 7.

However, if the sub-wavelength distance 15 is longer than half of the wavelength 55 of the reply signal 7, as shown in FIG. 5C, this could cause a phase ambiguity if the phase separation of the first phase and the second phase is too large. As an example, a phase difference measurement would be identical for a phase difference of 90 degrees as for a phase difference of 270 degrees. Hence, if the sub-wavelength distance 15 is less or equal to half of the wavelength of the reply signal 7, the phase difference measurement would yield a phase difference less or equal to about 180 degrees, without a risk of phase ambiguity.

It follows that at the station two 11, the second phase and the first phase are orthogonally demodulated separately with the same local signal to generate the intermediate frequency (IF) signal (not shown). The phase difference remains after demodulation. An analog to digital converter is then used to digitize the two IF signals and a correlation operation is performed between the signal having the second phase and the signal having the first phase, to find the phase difference. If the second phase is always leading as compared to the first phase by less than a half wavelength of 1090 MHz, then the intruder 4 is above the dashed line 40; or else the intruder 4 is below the dashed line 40.

The mathematical solution for the position of the point 35 and point 36, as defined above, is:

$$x = \frac{b^2 D \pm \sqrt{(b^4 D^2 - 4(b^2 - a^2)(D^2 b^2 + 4a^2 d_1^2 - 4a^2 b^2))}}{4(b^2 - a^2)} \quad (3)$$

$$y = \pm \sqrt{(d_1^2 - x^2)} \quad (4)$$

where $$a = \frac{d}{2}$$

$$b = \frac{d^2 - D^2}{4}$$

After the coordinates of the intruder 4 are calculated in the data processing unit 17, the information is sent to target tracking and display unit 18 for building/updating the tracks and displaying the intruder 4 on the screen.

Figure 5D:
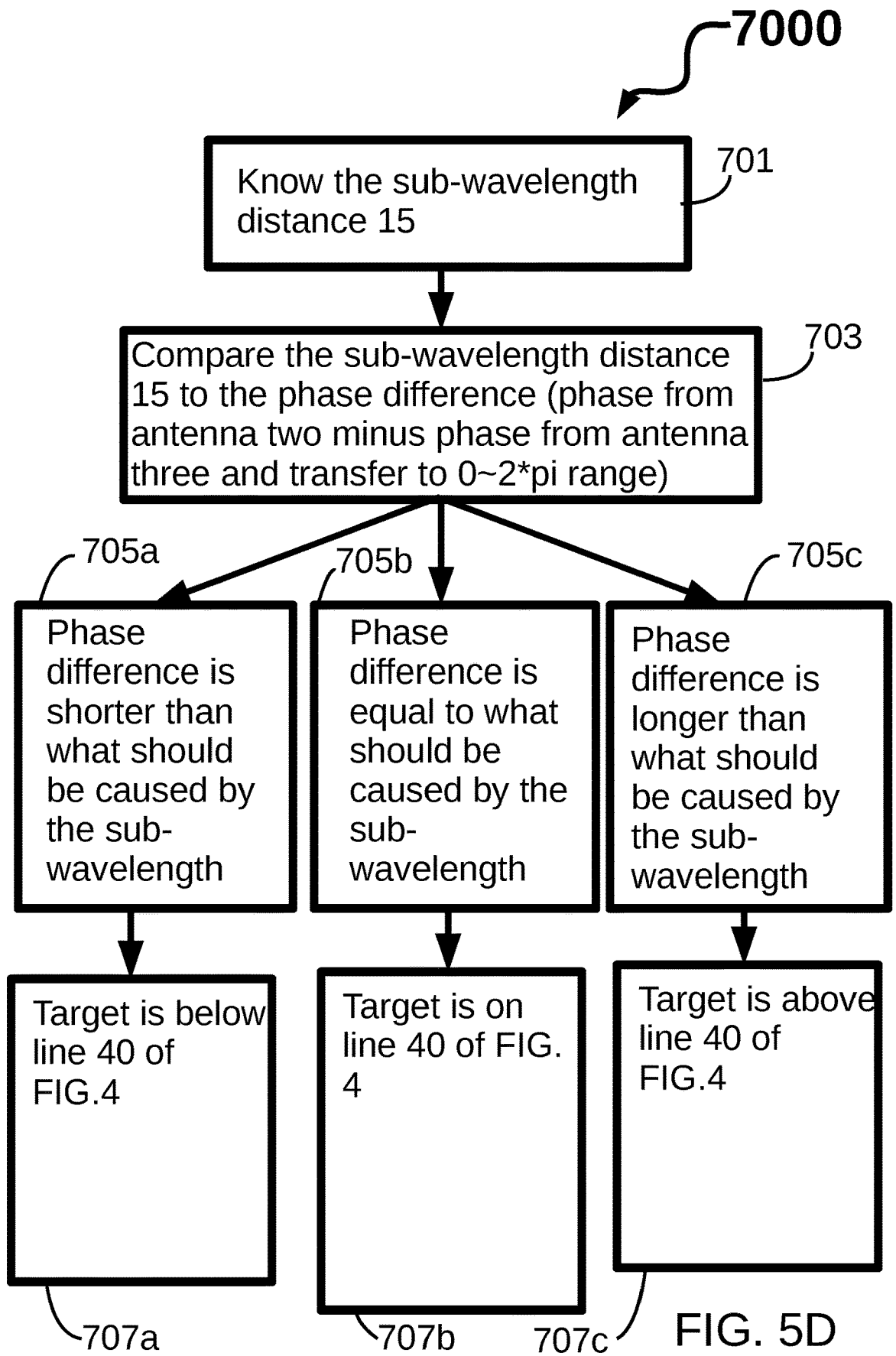
FIG. 5D is a flow chart outlining the method of determining the phase separation between a first phase and a second phase.
Figure 5E:
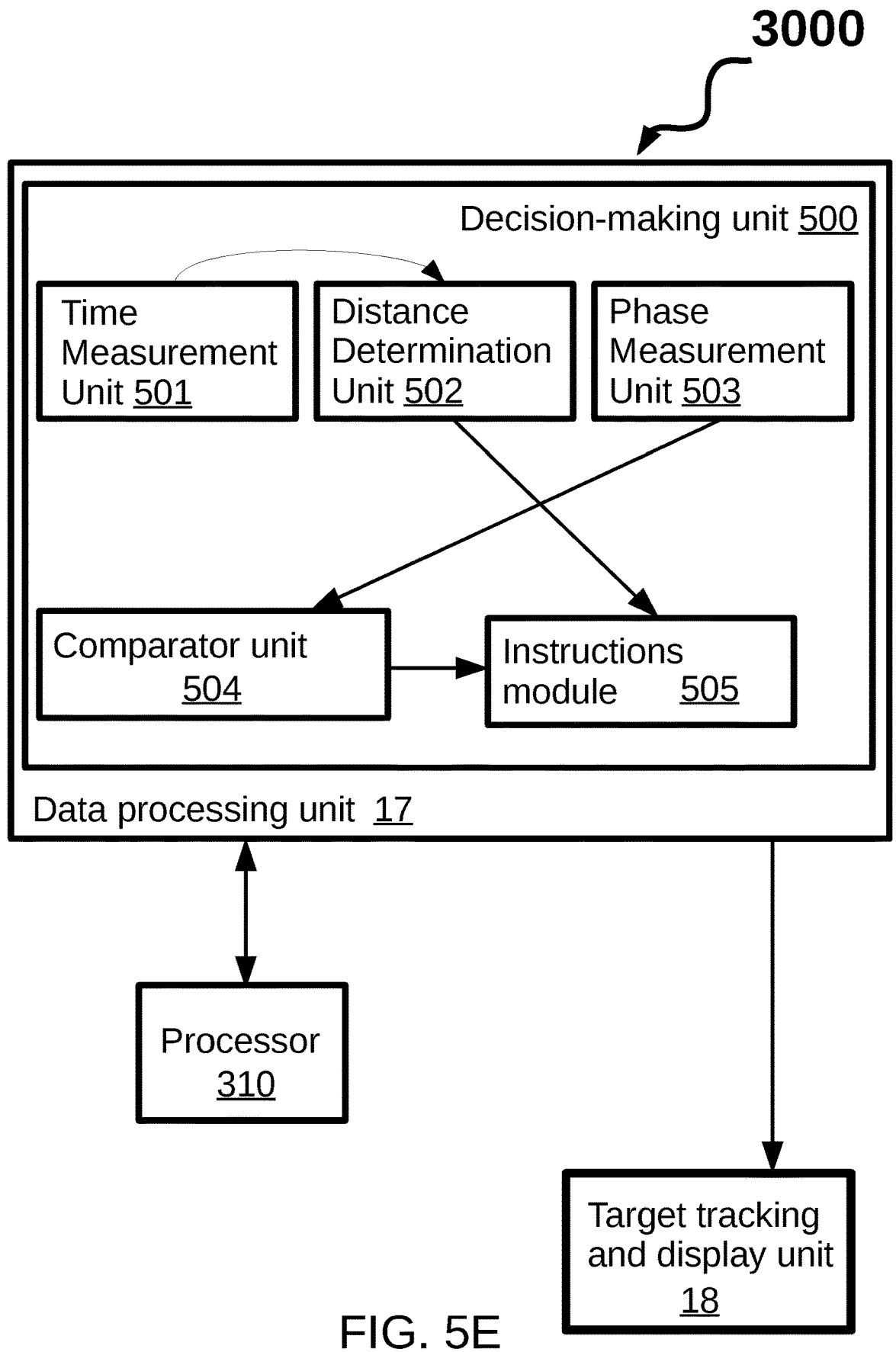
FIG. 5E is a schematic diagram of the system 3000, comprising the processor 310, the memory 440, the decision-making unit 500, and the target tracking and display unit 18.

FIG. 5D shows a flow chart of the steps taken by a decision-making unit 500, shown in FIG. 5E, with regards to determining which one should be chosen out of the two possible positions 35 and 36 of the intruder 4 based on the first phase and second phase. The first step 701 is to read the sub-wavelength distance 15 from system memory, then in the second step 703, the sub-wavelength distance is compared with the phase difference. An example process is as follows. By correlating the signal from antenna two 2 and antenna three 3, the phase difference, say the first phase minus the second phase can be determined. This phase difference is converted into an angle (A1) between 0 and 2*pi. The sub-wavelength distance 15 will also cause a reference phase difference corresponding to an angle A2 (for example, if the sub-wavelength distance 15 if half wavelength, then A2=180 degrees). Then the system compares A1 with A2. The result will be one of three options: a) The option 705a, where in A1 is smaller than A2, which will yield the result 705a that the intruder is below the line 40 in FIG. 4; b) The option 705b, wherein A1 equals to A2, which will yield the result 707b that the intruder is on the line 40 of FIG. 4; and c) The option 705c, wherein A1 is larger than A2, which will yield the result 707c that the intruder is above the line 40 of FIG. 4.

FIG. 5E is a schematic diagram of the system 3000, which shows the relationship between the data processing unit 17 and the target tracking and display unit 18. The system 3000 comprises a memory device, comprising computer-readable instructions stored thereon, for execution by a processor 310, forming a data processing unit 17, comprising a decision-making unit 500.

Inside the decision-making unit 500, the time measurement unit 501 employs the processor 310 to measure the times to, wherein to represents the time at which the interrogation signal 5 was sent, and $t_1$, $t_2$, representing the times when the reply signal 7 was received at the antenna one 1 and at the antenna two 2, respectively. Correspondingly, the first transit time $\Delta t_1 = t_1 - t_0$ and the second transit time $\Delta t_2 = t_2 - t_0$ can be measured. Remember at station two 11, the time measurement unit determine to by measuring time $t_{01}$. The measured time values are sent to the distance determination unit 502, where they are used to determine the distance $d_1$ from the target aircraft, or intruder 4, to the antenna one, and the sum distance $d = d_1 + d_2$. The decision-making unit 500 also comprises a phase measurement unit 503, which measures the first phase and the second phase, and obtains a phase difference measurement between the first phase and the second phase. All measurements from the phase measurement unit 503, are sent to the comparator unit 504. The comparator unit performs a comparative analysis on the measurement information obtained by the phase measurement unit 503. The comparator unit 504 determines whether a) the second phase is leading as compared to the first phase, by less or equal to about half of the wavelength (180 degrees); or b) the second phase is lagging as compared to the first phase, by less or equal to about half of the wavelength (180 degrees). The phase information from the comparator unit 504 and the distance measurement result from the distance determination unit 502 are sent to the instructions unit 505, which utilizes instructions thereon to extract the location of the intruder from the input information. Namely, the instructions module 505 calculates the two possible positions of the intruder using the distance information and then determine whether the intruder is at point 35, at one of the two possible locations, or point 36, at another of the two possible locations, according to FIG. 4A and FIG. 4B. The intruder 4 location information is sent by the instructions module 505 to the target tracking and display unit 18 and is shown on a screen. All calculations are executed by the processor 310, which may be a part of the data processing unit 17, or may be separate from the data processing unit 17.

In another embodiment, the system 1000 is also capable of receiving and decoding Automatic Dependent Surveillance-Broadcast (ADS-B) signals, and is capable of tracking any ADS-B equipped aircraft, or intruder. More important, the proposed active interrogation method is capable of anti-spoofing any false ADS-B devices and messages assuming every aircraft that has an ADS-B device also has a transponder. In this case, if a position obtained from an ADS-B message cannot be confirmed by a transponder position obtained by the method in this inversion, the ADS-B message is a false one.

Figure 6:
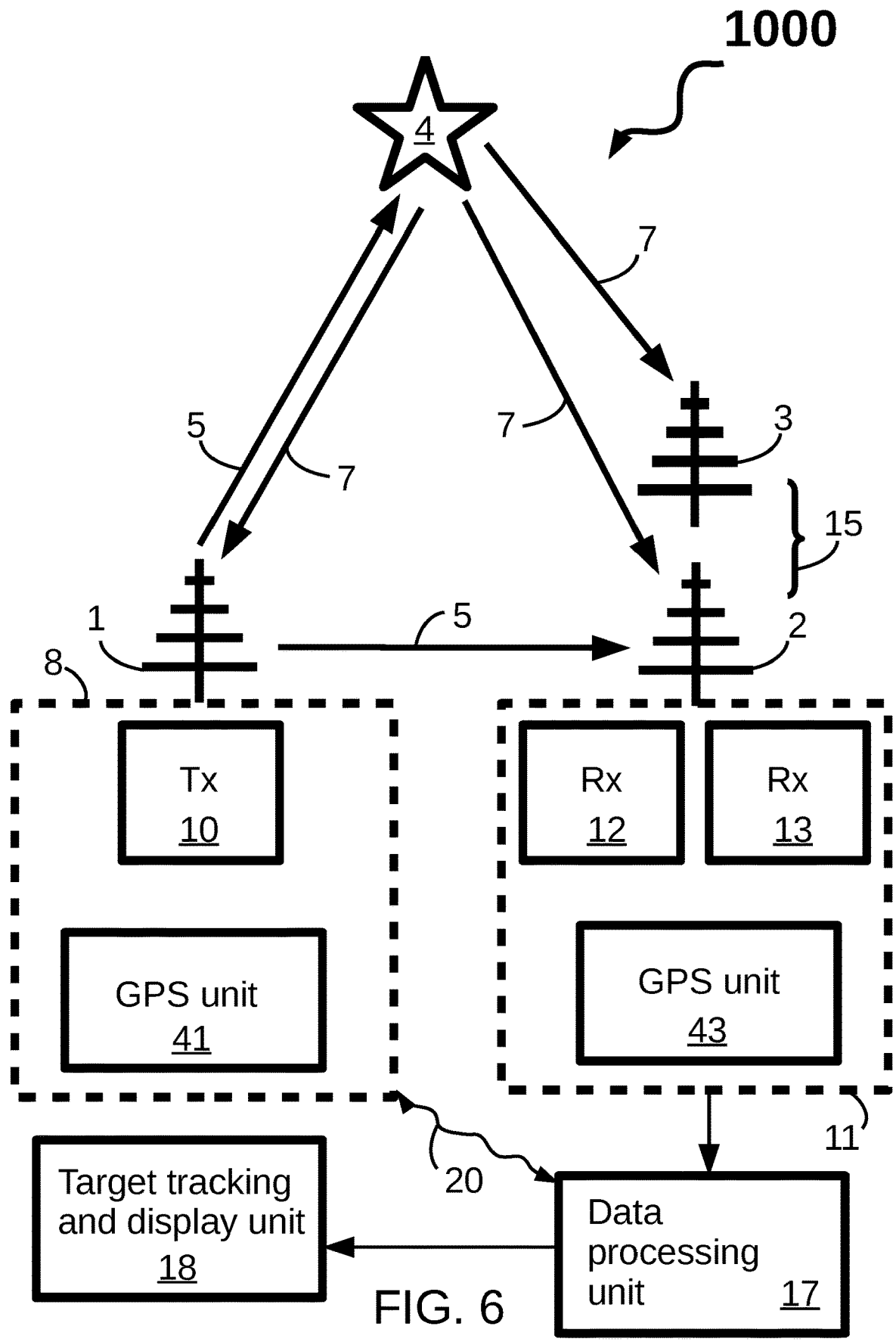
FIG. 6 is schematic diagram of the system 1000 further comprises a first GPS unit 41 and a second GPS unit 43.

In another embodiment, shown in FIG. 6, the station one 8 of system 1000 further comprises a first GPS unit 41, or a first global positioning system, and the station two 11 of system 1000 further comprises a second GPS unit 43, or a second global positioning system.

In this embodiment, instead of using a third Rx channel 14 at the station two 11 to observe the interrogation signal 5 from the station one 8, an accurate GPS timing from the first GPS unit 41 and the second GPS unit 43 can be used to replace the third Rx channel 14 at station two 11. This configuration is illustrated in FIG. 6. In the configuration of FIG. 6, the interrogation time $t_0$ can be directly obtained from the GPS unit 41 at the station one 8, and the receive time $t_2$ can be directly obtained from the GPS unit 43 at station two 11, so that the sum distance d can be calculated at the centre processor by using $t_0$ and $t_2$. In the embodiment of FIG. 6, the phase difference between the first phase and the second phase must still be measured, because GPS timing alone is not accurate enough to tell the time difference of arrival (TDOA) between the antenna two 2 and the antenna three 3.

The proposed system 1000 will only interrogate when it does not see an SSR signal so that an operation of the SSR is not disturbed by an active interrogation of the proposed system. However, there is a possibility that a higher flying aircraft may observe an SSR signal while the system 1000 does not see the SSR signal.

In this case, the intruder 4 aircraft, such as airliners, can send an reply signal that is not triggered by interrogation of the system 1000. This will affect the range of measurement of the system 1000. To avoid the problem, another embodiment of the present invention comprises a system 1000 which employs a different PRF pattern as compared to the PRF pattern of the airport SSR.

If using a different interrogation PRF pattern from the SSR, a reply signal 7, which is triggered by the system 1000 in response to the interrogation signal 5, is received within an expected delay time from the interrogation signal 5 time of the system 1000. However, reply signals, triggered by the SSR, will be randomly delayed after the interrogation signal 5 of the system 1000. In yet another embodiment of the present invention, the reply signal 7 caused by the system 1000 is discriminated from SSR reply signals, by a few continuous observations.

In another embodiment, when the intruder 4 is located within an SSR coverage of an airport, in order that the system 1000 does not interrupt the normal operation of the an airport SSR, the auto switch on/off of the single channel transmitter (Tx) 10 is applied via an observation channel in station two 11 (not shown), operating at 1030 Mhz. When the observation channel at station two 11 receives an SSR interrogation signal from an airport, the single channel transmitter (Tx) 10 at station one 8 will be turned off. Otherwise, the single channel transmitter (Tx) 10 will be turned on and performing the active positioning.

Figure 7:
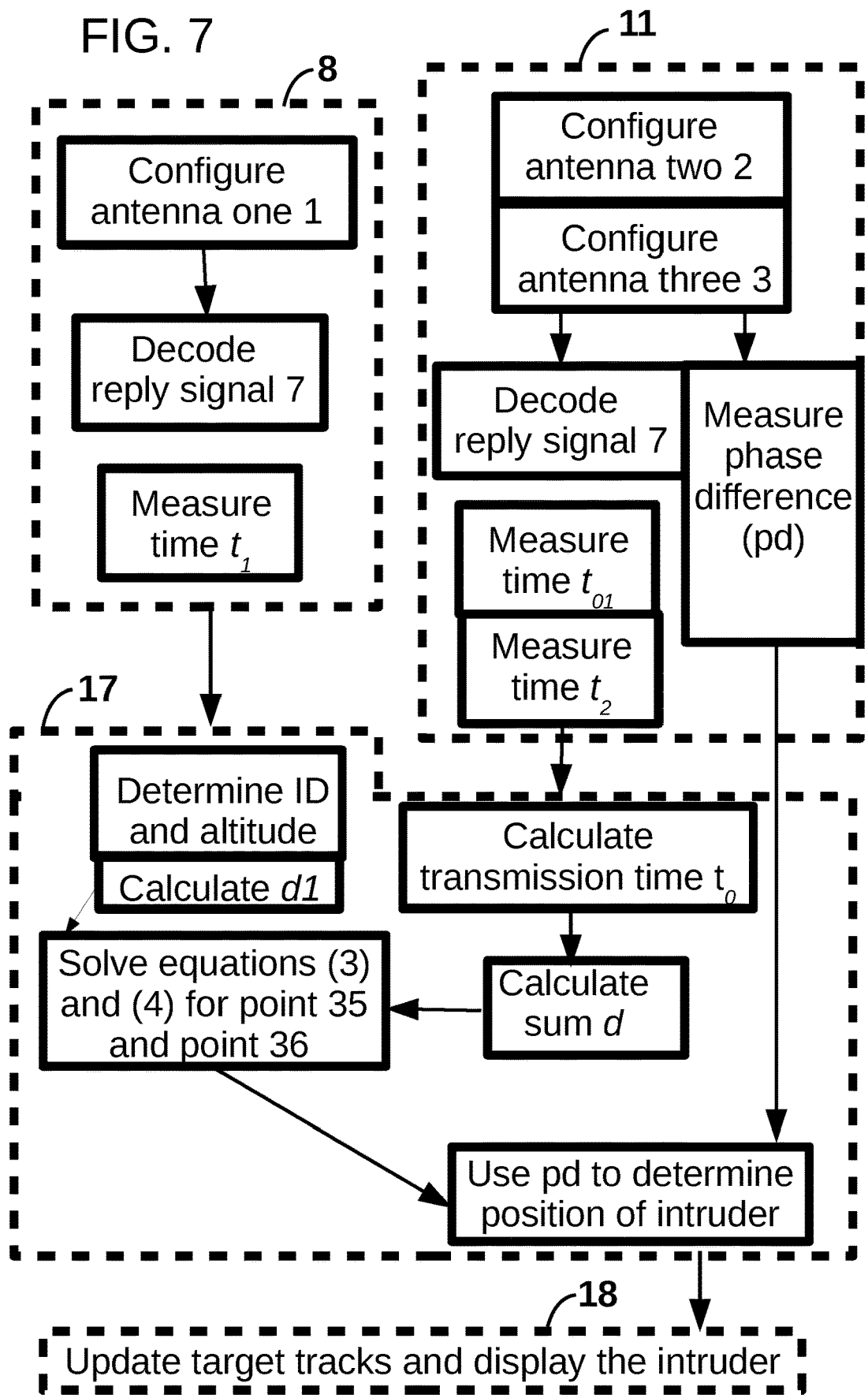
FIG. 7 is a flow chart outlining the method of determining the position of the intruder 4 via the system 1000.

In another embodiment of the present invention, there is a method of determining the position of the intruder 4. Steps of the algorithm are shown in FIG. 7.

1. Configure an antenna one 1 at a station one 8 to send an interrogation signal 5 and receive a reply signal 7 from an intruder 4, and an antenna two 2 at a station two 11 to receive the interrogation signal 5, and receive a reply signal 7 from an intruder 4, and an antenna three 3 to receive a reply signal 7 from an intruder 4.

2. Decode the reply signal 7 from an intruder 4 at station one 8 and station two 11, determine the identification (ID) and altitude of the intruder 4 in the data processing unit 17.

3. Measure the receive time $t_1$ at station one 8. Calculate the first transit time $\Delta t_1$ and calculate the radius $d_1$ 33 in the data processing unit 17.

4. Measure the initial time $t_{01}$ at station two 2 and calculate the transmission time $t_0$ in the data processing unit 17.

5. Measure receive time $t_2$ at station two 2. Calculate the second transit time $\Delta t_2$ and calculate the sum distance $d=d_1+d_2$ in the data processing unit 17.

6. Solve the equations (3) and (4) for point 35 and point 36, to obtain the coordinates of the two possible locations of intruder 4 in the data processing unit 17.

7. Compare the first phase to the second phase, by orthogonally demodulating the two signals separately with the same local signal to generate the intermediate frequency (IF) signal and digitizing the IF signal.

8. Use the digitized signal to calculate the phase difference between the first phase and the second phase.

9. Use the phase difference to determine whether the position of the intruder 4 is at point 35, at one of the two possible locations, or at point 36, at another of the two possible locations, in the data processing unit 17.

10. Send the position information along with the intruder 4 identification (ID) and altitude information to the target tracking and display unit 18, to update the target tracks and display the intruder 4 on a screen of the display unit 18.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect. For example, the principles of the invention can be applied to other contexts such as marine or nautical and terrestrial context.

There is an alternative way to calculate the two possible positions of the intruder. For example, the system may determine $d_1$ and $d_2$ distances separately, so the two possible positions of the intruder will be the interceptions of two circles instead of a circle and an ellipse.

The processes described above are computationally intensive requiring the use of multiple hardware processors. A variety of processors, such as microprocessors, digital signal processors, and gate arrays, may be employed. Generally, processor-readable media are needed and may include floppy disks, hard disks, optical disks, Flash ROMS, non-volatile ROM, and RAM.

It should be noted that methods and systems of the embodiments of the invention and data sets described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

Methods and systems of the present invention have tangible and practical advantages.

What is claimed is:

1. A system for determining a location of an intruder in airspace, comprising:
    an antenna one at a station one, spaced apart along a baseline at a baseline distance from an antenna two at a station two, the antenna two being spaced apart at a sub-wavelength distance from an antenna three at the station two, the antenna three being disposed off the baseline;
    the antenna one being configured to send an interrogation signal;
    the antenna one, the antenna two and the antenna three being configured to receive a reply signal from the intruder, in response to the interrogation signal;
    the system being further configured to:
        determine two possible locations of the intruder, using the reply signal of the intruder, received at the antenna one and at the antenna two, respectively comprising:

measuring a first transit time, and a second sum time representing times of transit of the reply signal from the intruder to the station one, and a sum time the signal transmits from the station one to the intruder and from the intruder to the station two, respectively;

determining a first distance from the intruder to the antenna one, and a second sum distance from the antenna one to the intruder and from the intruder to the antenna two, by using the first transit time and the second sum time, respectively; and determining the two possible locations of the intruder, each location being at an intersection of a circle with a radius equal to the first distance and an ellipse formed using the antenna one and the antenna two as two focal points;

and discriminate between the two possible locations of the intruder, using the reply signal received at the antenna two and at the antenna three, thereby determining the location of the intruder.

2. The system of claim 1, further comprises a first and a second global positioning systems (GPS), respectively located near the antenna one, and near the antennas two and three, to determine the first transit time, and the second sum time, respectively.

3. The system of claim 1, wherein the sub-wavelength distance as one of the following:
less than about half of a wavelength of the reply signal;
about half of the wavelength of the reply signal.

4. The system of claim 1, wherein the antenna one, the antenna two and the antenna three are disposed as one of the following:
the antenna one, the antenna two, and the antenna three on a ground;
the antenna one, the antenna two, and the antenna three on an aircraft;
the antenna one on the ground, and the antenna two and the antenna three on the aircraft;
the antenna one on the aircraft, and the antenna two and the antenna three on the ground.

5. The system of claim 1, configured to send and receive Automatic Dependent Surveillance-Broadcast (ADS-B) signals.

6. A system for determining a location of an intruder in airspace, comprising:
an antenna one, spaced apart along a baseline at a baseline distance from an antenna two at a station two, the antenna two being spaced apart at a sub-wavelength distance from an antenna three, the antenna three being disposed off the baseline;
the antenna one being configured to send an interrogation signal;
the antenna one, the antenna two and the antenna three being configured to receive a reply signal from the intruder, in response to the interrogation signal;
the system being further configured to:
determine two possible locations of the intruder, using the reply signal of the intruder, received at the antenna one and at the antenna two, respectively; and
discriminate between the two possible locations of the intruder, using the reply signal received at the antenna two and at the antenna three, thereby determining the location of the intruder, comprising:
measuring a first phase of the reply signal received by the antenna two, and a second phase of the reply signal received by the antenna three, and determine a phase difference between the first phase and the second phase.

7. The system of claim 6, further configured to:
demodulate the reply signal received by the antenna two containing the first phase and the reply signal received by the antenna three containing the second phase, to generate a first intermediate frequency signal and a second intermediate frequency signal, respectively;
digitize the first intermediate frequency signal and the second intermediate frequency signal;
correlate the digitized first intermediate frequency signal and the digitized second intermediate frequency signal, thereby determining the phase difference.

8. The system of claim 6, further configured to:
choose one of the two possible locations, provided the second phase is leading as compared to the first phase by using the phase difference; and
choose another of the two possible locations, provided the second phase is lagging as compared to the first phase by using the phase difference.

9. The system of claim 6, wherein the sub-wavelength distance as one of the following:
less than about half of a wavelength of the reply signal;
about half of the wavelength of the reply signal.

10. The system of claim 6, wherein the antenna one, the antenna two and the antenna three are disposed as one of the following:
the antenna one, the antenna two, and the antenna three on a ground;
the antenna one, the antenna two, and the antenna three on an aircraft;
the antenna one on the ground, and the antenna two and the antenna three on the aircraft;
the antenna one on the aircraft, and the antenna two and the antenna three on the ground.

11. The system of claim 6, configured to send and receive Automatic Dependent Surveillance-Broadcast (ADS-B) signals.

12. In a system for determining a location of an intruder in airspace, comprising an antenna one at a station one, spaced apart along a baseline at a baseline distance from an antenna two at a station two, the antenna two being spaced apart at sub-wavelength distance from an antenna three at the station two, the antenna three being disposed off the baseline; the antenna one sending an interrogation signal; the antenna one, the antenna two and the antenna three receiving a reply signal from the intruder, respectively, in response to the interrogation signal:
a computer memory device having computer readable instructions stored thereon for execution by a processor, causing the processor to:
determine two possible locations of the intruder, using the reply signal of the intruder, received at the antenna one and at the antenna two, respectively, comprising:
measuring a first transit time and a second sum time representing times of transit of the reply signal from the intruder to the station one, and the sum time the signal transmit from the station one to the intruder and from the intruder to the station two, respectively;
determining a first distance from the intruder to the antenna one, and a second sum distance from the antenna one to the intruder and from the intruder to the antenna two, by using the first transit time and the second sum time, respectively; and determining the two possible locations of the intruder, each location being at intersection of a circle with a radius equal to the first distance and an ellipse formed using the antenna one and the antenna two as two focal points;
and
discriminate between the two possible locations of the intruder, using the reply signal received at the antenna two and at the antenna three, thereby determining the location of the intruder.

13. A method of determining a location of an intruder in airspace, comprising:
sending an interrogation signal from an antenna one at a station one, spaced apart along a baseline at a baseline distance from an antenna two at a station two, the antenna two being spaced apart at a sub-wavelength distance from an antenna three at the station two, the antenna three being disposed off the baseline;
receiving a reply signal from the intruder at the antenna one, at the antenna two and at the antenna three, in response to the interrogation signal;
determining two possible locations of the intruder, using the reply signal of the intruder, received at the antenna one and at the antenna two, respectively, comprising:
measuring a first transit time and a second sum time representing times of transit of the reply signal from the intruder to the station one, and the sum time the signal transmits from the station one to the intruder and from the intruder to the station two, respectively;
determining a first distance from the intruder to the antenna one, and a second sum distance from the antenna one to the intruder and from the intruder to the antenna two, by using the first transit time and the second sum time, respectively; and
determining the two possible locations of the intruder, each location being at intersection of a circle with radius equal to the first distance and an ellipse formed using the antenna one and the antenna two as two focal points;
and
discriminating between the two possible locations of the intruder, using the reply signal received at the antenna two and at the antenna three, thereby determining the location of the intruder.

14. The method of claim 13, further comprising determining the first transit time, and second sum time by a first and a second global positioning systems (GPS), respectively located near the antenna one, and near the antennas two and three.

15. The method of claim 13, further comprising choosing the sub-wavelength distance as one of the following:
less than about half of a wavelength of the reply signal;
about half of the wavelength of the reply signal.

16. The method of claim 13, further comprising disposing the antenna one, the antenna two and the antenna three as one of the following:
the antenna one, the antenna two, and the antenna three on a ground;
the antenna one, the antenna two, and the antenna three on an aircraft;
the antenna one on the ground, and the antenna two and the antenna three on the aircraft;
the antenna one on the aircraft, and the antenna two and the antenna three on the ground.

17. The method of claim 13, further comprising disposing the antenna two and the antenna three, such that:
a line connecting the antenna two and the antenna three forms about a 90 degree angle with the baseline;
the line connecting the antenna two and the antenna three forms a non-perpendicular angle with the baseline.

18. The method of claim 13, wherein the sending and the receiving comprise sending and receiving Automatic Dependent Surveillance-Broadcast (ADS-B) signals.

19. A method of determining a location of an intruder in airspace, comprising:
sending an interrogation signal from an antenna one, spaced apart at a baseline distance from an antenna two, along a baseline, and the antenna two being spaced apart at an sub-wavelength distance from an antenna three, the antenna three being disposed off the baseline;
receiving a reply signal from the intruder at the antenna one, at the antenna two and at the antenna three, in response to the interrogation signal;
determining two possible locations of the intruder, using the reply signal of the intruder, received at the antenna one and at the antenna two, respectively; and
discriminating between the two possible locations of the intruder, using the reply signal received at the antenna two and at the antenna three, thereby determining the location of the intruder, wherein the method further comprises:
measuring a first phase of the reply signal received by the antenna two, and a second phase of the reply signal received by the antenna three, and determining a phase difference between the first phase and the second phase.

20. The method of claim 19, further comprising:
demodulating the reply signal received by the antenna two containing the first phase and the reply signal received by the antenna three containing the second phase, to generate a first intermediate frequency signal and a second intermediate frequency signal, respectively;
digitizing the first intermediate frequency signal and the second intermediate frequency signal; and
correlating the digitized first intermediate frequency signal and the digitized second intermediate frequency signal, thereby determining the phase difference.

21. The method of claim 19, further comprising:
choosing one of the two possible locations, provided the second phase is leading as compared to the first phase by using the phase difference; and
choosing another of the two possible locations, provided the second phase is lagging as compared to the first phase by using the phase difference.

22. The method of claim 19, further comprising choosing the sub-wavelength distance as one of the following:
less than about half of a wavelength of the reply signal;
about half of the wavelength of the reply signal.

23. The method of claim 19, further comprising disposing the antenna one, the antenna two and the antenna three as one of the following:
the antenna one, the antenna two, and the antenna three on a ground;
the antenna one, the antenna two, and the antenna three on an aircraft;
the antenna one on the ground, and the antenna two and the antenna three on the aircraft;
the antenna one on the aircraft, and the antenna two and the antenna three on the ground.

24. The method of claim 19, further comprising disposing the antenna two and the antenna three, such that:
a line connecting the antenna two and the antenna three forms about a 90 degree angle with the baseline;

the line connecting the antenna two and the antenna three forms a non-perpendicular angle with the baseline.

25. The method of claim 19, wherein the sending and the receiving comprise sending and receiving Automatic Dependent Surveillance-Broadcast (ADS-B) signals.

26. In a system for determining a location of an intruder in airspace, comprising an antenna one, spaced apart at a baseline distance from an antenna two, along a baseline, and the antenna two being spaced apart at a sub-wavelength distance from an antenna three, the antenna three being disposed off the baseline; the antenna one sending an interrogation signal; the antenna one, the antenna two and the antenna three receiving a reply signal from the intruder, in response to the interrogation signal:
   a computer memory device having computer readable instructions stored thereon for execution by a processor, causing the processor to:
      determine two possible locations of the intruder, using the reply signal of the intruder, received at the antenna one and at the antenna two, respectively; and
      discriminate between the two possible locations of the intruder, using the reply signal received at the antenna two and at the antenna three, comprising measuring a first phase of the reply signal received by the antenna two, and a second phase of the reply signal received by the antenna three, and determining a phase difference between the first phase and the second phase, thereby determining the location of the intruder.

* * * * *